(12) United States Patent
Palmer

(10) Patent No.: US 12,236,981 B1
(45) Date of Patent: Feb. 25, 2025

(54) METHODS, SYSTEMS, APPARATUSES, AND DEVICES FOR FACILITATING COLLABORATIVE LIVE MUSIC CREATION

(71) Applicant: Mark Lawrence Palmer, Thailand (TH)

(72) Inventor: Mark Lawrence Palmer, Thailand (TH)

( * ) Notice: Subject to any disclaimer, the term of this patent is extended or adjusted under 35 U.S.C. 154(b) by 0 days.

(21) Appl. No.: 18/644,149

(22) Filed: Apr. 24, 2024

(51) Int. Cl.
*G11B 27/10* (2006.01)
*H04L 65/403* (2022.01)

(52) U.S. Cl.
CPC ............ *G11B 27/10* (2013.01); *H04L 65/403* (2013.01)

(58) Field of Classification Search
CPC .............................. G11B 27/10; H04L 65/403
USPC ......................................................... 386/241
See application file for complete search history.

(56) References Cited

U.S. PATENT DOCUMENTS

| | | | | |
|---|---|---|---|---|
| 8,319,086 | B1* | 11/2012 | Iampietro | G11B 27/10 84/600 |
| 10,560,657 | B2* | 2/2020 | Noel | G11B 27/031 |
| 10,971,191 | B2* | 4/2021 | Godfrey | G06F 16/686 |
| 12,035,431 | B2* | 7/2024 | Cremer | F21S 10/02 |
| 2022/0188062 | A1* | 6/2022 | Pachet | G05B 15/02 |
| 2024/0139626 | A1* | 5/2024 | Ma | A63F 13/426 |

OTHER PUBLICATIONS

What Is Looping and How to Use It in Your Music Production, Aug. 22, 2023, LANDR, https://blog.landr.com/looping/.
Julian Blackmore, What is Looping in Music and How do I Use It?, Sep. 6, 2022, Master Blog, https://emastered.com/blog/what-is-looping-in-music.
Practical Uses for a Guitar Looper Pedal, Jan. 19, 2022, Pathfinder Guitar, https://pathfinderguitar.com.au/guitar-blog/practical-uses-for-a-guitar-looper-pedal.
Juliette Bell, The Versatility of Loopers: Practicing Solos and Live Hacks, Jan. 28, 2020, She Shreds Media, https://sheshreds.com/the-versatility-of-loopers/.
Loop (music), Wikipedia, https://en.wikipedia.org/wiki/Loop_(music).
Kevin McHugh, What is looping in music? How to use loops in music production, Mar. 21, 2023, Native Instruments, https://blog.native-instruments.com/loops-in-music/.
Music Collaboration and COVID-19 Quarantine, Mar. 22, 2020, MIT Media, https://web.media.mit.edu/~holbrow/post/music-collaboration-and-covid-19-quarantine/.

* cited by examiner

*Primary Examiner* — Helen Shibru
(74) *Attorney, Agent, or Firm* — Dhiraj Jindal; PATENT YOGI LLC

(57) ABSTRACT

Disclosed herein is a method for facilitating collaborative live music creation, in accordance with some embodiments. Accordingly, the method may include receiving a musical segment information associated with a musical segment, obtaining the musical segment and a second musical segment, obtaining a time reading of a time reference, synchronizing the second musical segment and the musical segment with the time reference based on the time reading, initiating a playback of the musical segment and the second musical segment based on the synchronizing, generating a prompt, obtaining a response corresponding to the prompt, generating a second musical segment information of the second musical segment based on the synchronizing and the response, and transmitting the second musical information of the second musical segment.

20 Claims, 16 Drawing Sheets

METHODS, SYSTEMS, APPARATUSES, AND DEVICES FOR FACILITATING COLLABORATIVE LIVE MUSIC CREATION

This application claims the benefit of international application No. PCT/US23/34868 filed on 11 Oct. 2023 and titled "METHODS, SYSTEMS, APPARATUSES, AND DEVICES FOR FACILITATING COLLABORATIVE LIVE MUSIC CREATION", which is incorporated by reference herein in its entirety.

FIELD OF THE INVENTION

Generally, the present disclosure relates to the field of data processing. More specifically, the present disclosure relates to methods, systems, apparatuses, and devices for facilitating collaborative live music creation.

BACKGROUND OF THE INVENTION

The field of data processing is technologically important to several industries, business organizations, and/or individuals.

In the field of digital music creation and collaboration, timing is important. Musicians need to be able to synchronize their playing, whether they are in the same room or collaborating remotely. Existing techniques for facilitating real time music creation are deficient in several ways. For instance, traditional methods of synchronization, such as using a metronome or a conductor, are not always practical or effective, especially in a digital or remote context, where network latency will delay the beat signal (click track, tempo, and count) used by each player by differing amounts, making synchronization impossible. Further, the latency is a major obstacle to existing technologies (such as online music creation tools [8]) to create live music online.

Moreover, the process of quantization, which aligns musical notes to a precise time grid, is typically performed after the music has been recorded. This post-production process can correct timing inaccuracies, but it does not help musicians to play in time with each other during a live performance or recording session.

In the realm of music performance, whether it is a solo performance or a large ensemble, maintaining a consistent tempo is crucial. Traditionally, musicians have relied on metronomes, a device that produces a regular, audible beat at a user-adjustable rate, to keep a steady tempo while playing music [1]. However, in large-scale performances or in situations where musicians are spread across a wide geographical area, the use of traditional metronomes can be challenging.

Moreover, in the context of digital music creation and collaboration, the use of a shared device or a conductor/orchestra setup may not be feasible. The advent of digital metronomes and click tracks has provided some solutions, especially in studio recordings and some live situations [6]. However, these solutions do not cater to the dynamic and spontaneous nature of jam sessions, particularly those involving a large number of participants spread over a wide geographical area.

Looping is a music production technique that has become essential in modern music creation [1]. Also, much of traditional music can be deconstructed into individual repeating parts, as repetition is a key aspect of music. A looper, or loop station, allows a musician to record a musical segment, and then have the device play the segment back once, or indefinitely [2]. Live looping is a type of musical performance where one musician records multiple loops successively on a loop station, which replays each recorded loop as new ones are layered on [7]. However, when multiple loops are mixed, current technology requires that this happen on the same device, the 'loop station', so the different instrumental parts can be synchronized [5]. Loops recorded on different Looper devices or pedals currently have no means of synchronizing [6].

Music has long been a medium for expressing emotions and connecting with others. In the context of dating and social interactions, music can serve as a powerful tool for conveying personal tastes, values, and emotions. In the era of cassette tapes, "mix tapes" were often created with a selection of songs specifically chosen to convey certain sentiments or shared experiences. Today, with the advent of digital music and streaming services, users often share playlists or favorite songs on their social media or dating profiles as a way to express their personality and musical tastes.

Popular dating apps have integrated playlists into their platforms, allowing users to display their favorite songs on their profiles and giving potential matches a sense of their music taste. However, these features are based on sharing pre-recorded songs, artists, or genres.

Background, ambient music in public or private venues may be unsatisfactory. Currently, the selection available (e.g. on a jukebox) is limited to choosing songs or artists, with limited possibility to convey the brand of the host venue as part of the musical ambiance. Background venue music may be amenable to the participation of visitors or customers to create and influence the composition of such music.

Therefore, there is a need for improved methods, systems, apparatuses, and devices for facilitating collaborative live music creation that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method for facilitating collaborative live music creation, in accordance with some embodiments. Accordingly, the method may include receiving, using a client side communication device of a client device, at least one musical segment information associated with at least one musical segment. Further, the method may include obtaining, using a client side processing device of the client device, at least one of the at least one musical segment and a second musical segment. Further, the method may include obtaining, using a timing unit of the client device, at least one time reading of at least one time reference. Further, the method may include synchronizing, using the client side processing device of the client device, at least one of the second musical segment and the at least one musical segment with the at least one time reference based on the at least one time reading, wherein the synchronizing comprises aligning a beat of at least one of the at least one musical segment and the second musical segment with the at least one time reference in a uniform way. Further, the method may include initiating, using a sound reproduction device of the client device, a playback of at least one of the at least one musical segment and the second musical segment based on the synchronizing. Further, the method may include may include generating, using the client side processing device of the client device, a prompt based on the initiating of the playback. Further, the method may include obtaining, using the client side processing device of the client device, a response corresponding to the prompt. Further, the method may include generating, using the client side processing device of the client device, at least one second musical segment information of the second musical segment based on the synchronizing and the response. Further, the method may include transmitting, using the client side communication device of the client device, the at least one second musical segment information of the second musical segment Further disclosed herein is a system for facilitating collaborative live music creation. Further, the system may include a client device. Further, the client device may include a client side communication device configured for receiving at least one musical segment information associated with at least one musical segment. Further, the client side communication device may be configured for transmitting at least one second musical segment information of a second musical segment. Further, the client device may include a timing unit configured for obtaining at least one time reading of at least one time reference. Further, the client device may include a client side processing device communicatively coupled with the client side communication device and the timing unit. Further, the client side processing device may be configured for obtaining at least one of the at least one musical segment and the second musical segment. Further, the client side processing device may be configured for synchronizing at least one of the second musical segment and the at least one musical segment with the at least one time reference based on the at least one time reading. Further, the client side processing device may be configured for generating a prompt. Further, the client side processing device may be configured for obtaining a response corresponding to the prompt. Further, the client side processing device may be configured for generating the at least one second musical segment information of the second musical segment based on the synchronizing and the response. Further, the client device may include a sound reproduction device communicatively coupled with the client side processing device. Further, the sound reproduction device may be configured for initiating a playback of at least one of the at least one musical segment and the second musical segment based on the synchronizing. Further, the generating of the prompt may be based on the initiating of the playback.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
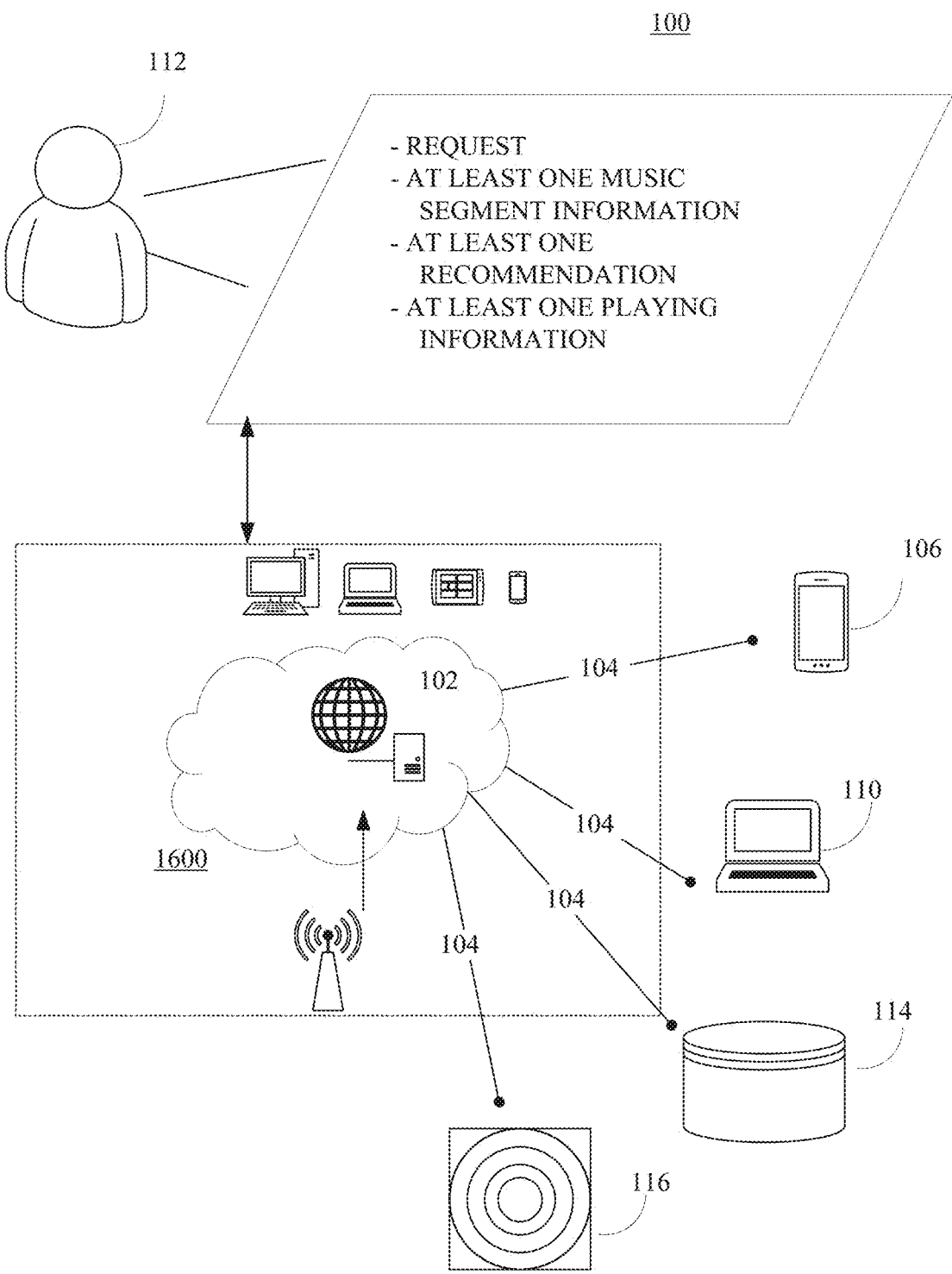
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating collaborative music creation, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer and/or computing device may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer and/or computing device may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer and/or computing device may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure.

Further, one or more steps of the method may be automatically initiated, maintained band/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), and a biometric sensor (e.g. a fingerprint sensor) associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Overview:

The present disclosure describes methods and systems for facilitating collaborative live music creation, by players who may have no musical knowledge or skill.

Further, the present disclosure describes Real Time Quantization (RTQ) method for providing a way to synchronize musical parts in real time, using a universal time reference. This enables musicians to play in time with each other, regardless of their location or the latency of their internet connection. Further, the disclosed system also allows for the immediate playback of musical segments, with no waiting for the next beat or measure to begin.

The RTQ method represents a significant advancement in the field of digital music creation and collaboration. Further, the RTQ makes it easier for musicians to collaborate remotely, and it improves the quality of their live performances by ensuring precise timing and synchronization.

Further, in some embodiments, the disclosed system may include a jam server or service that has an API that allows users to register a 'jam-space', or context for other users to discover and contribute musically to a real-time creation. The users of the API may be presumed to have an embodiment of the tempo synchronization method.

Further, the jam server's API provides several functions:
1. Jam-Space Creation and Registration: The users may create and register new jam spaces. Each jam-space instance has a set of musical properties (e.g., tempo, count, key, genre, session schedule) and inclusion rules (e.g., maximum participants, geographic radius, an access key, or password). Further, in some embodiments, the jam server may optionally be configured for performing user authentication, or to allow participation of anonymous users. Once created, the jam-space may have an ID that can be shared to allow access, or it may simply include all participants within a geographic area.
2. Jam-Space Discovery: The API allows clients to query the server to find jam spaces they may wish to join, based on input location or musical criteria.
3. Musical Part Registration: The API allows the registration of individual musical parts to a jam-space. This enables all participants of that jam-space to find, load, and optionally mix the relevant musical parts on each client device. Registration may specify aspects of how the part is to be reproduced in a mix, including whether it should repeat, volume, spatial, and movement properties. Further, the musical parts may also include imagery, video, or other metadata that can be used to display a visual accompaniment or representation of each segment in the mix. The visual metadata may be input to a visualization algorithm to provide further visualization for the musical mix as it evolves.
4. Feedback and Messaging: The API allows jam-space participants to register a feedback relevant to current musical segments, possibly remove segments, and message other participants.
5: Learning human musical preferences and providing guidance The API server tracks how often each musical segment is paired or grouped together segments over time, to create an affinity matrix. The waveforms associated with each segment are used to train a Supervised Learning component that captures human intuition by analyzing the input waveforms. Further, the jam server may not need to perform any mixing or synchronizing itself. It merely makes information available about sessions, participants, and properties of the musical elements, including spatial location. The service may be realized as a peer-to-peer broadcast communication as well as a server.

Further, an RTQ algorithm associated with the RTQ method takes as inputs:
a) A musical segment to be played in synchronization with other participants' selected segments. The musical segment may be prerecorded or may be arriving via microphone or line input. The beginning of the segment is normally the start of a measure and is indicated by an offset, defaulting to zero.
b) Metadata of tempo and count for the segment. If metadata is not present, the sample may be analyzed with known algorithms to extract its tempo and identify beat offsets.
c) A universal time reading, nominally UTC in milliseconds.

Further, the RTQ algorithm uses the tempo and count to calculate the UTC timestamp of the next upcoming beat and measure, by dividing universal time into intervals in a standard way. The RTQ algorithm establishes a mapping uniquely assigning a given beat to a millisecond timestamp.

Given the input tempo and count, the RTQ algorithm calculates the next measure start point, by grouping sets of beats according to the count.

Further, the RTQ algorithm schedules the start of the buffer to begin playing at the calculated UTC timestamp for starting the next measure of beats at the input count and tempo. Further, the RTQ algorithm then subtracts the current UTC time from the upcoming UTC start-segment time and calculates the corresponding offset within the segment buffer to begin playing immediately. Thus, once a segment is loaded, the segment may be played immediately, synchronizing its beat with different segments playing on other devices—with no latency or waiting for the next beat or measure to begin.

If the live input signal is arriving slightly off-beat, it can be delayed slightly before being output. This process, when used in a Digital Audio Workstation, is known as 'quantization'. RTQ quantization aligns tempos to a true universal tempo, similar to how auto-tune aligns pitch to true pitch.

Further, the jam session specifies the tempo, key, etc. of segments that may be added, and rejects incompatible segments from being Joined to the jam. The client device merely accepts indications of what segments are currently joined into the jam mix, and creates the mix on each client, only needing to synchronize the resulting mix to real time using the RTQ algorithm. However, each client may create a slightly different mix when given an identical set of segments to mix. This difference may arise from representing the current user's spatial perspective in the jam. In unamplified music, each player will hear their own instrument as the loudest in the mix. A client may also play a segment to preview how it sounds in the mix, before actually Joining the mix.

Further, the present disclosure describes a method for facilitating the interactive creation of live music by multiple users. Further, the method may include using a Real Time Quantization (RTQ) algorithm that takes as inputs a musical segment, metadata of tempo and counts for the segment, and a universal time reading, and calculates the UTC timestamp of the next upcoming beat and measures start.

Further, in some embodiments, the RTQ algorithm schedules the start of the buffer to begin playing at the calculated UTC timestamp, subtracts the current UTC time from the upcoming UTC start-segment time, and calculates the corresponding offset within the segment buffer to begin playing immediately.

Further, in some embodiments, if a live input signal is arriving slightly off-beat, it can be delayed slightly before being output, a process known as 'quantization'. A musician playing the live segment can react quickly to align further playing with the quantized tempo of the jam.

Further, in some embodiments, the RTQ quantization aligns tempos to a true universal tempo, similar to how auto-tune aligns pitch to true pitch.

The present disclosure describes a system for facilitating the interactive creation of live music by multiple users, wherein the system may include a jam server with an API that allows users to create and register a 'jam-space', discover jam spaces based on input location, or musical criteria, register individual musical parts to a jam-space, and register feedback and messages.

Further, in some embodiments, the jam server does not perform any mixing or synchronizing itself but makes information available about sessions, participants, and properties of the musical elements, including spatial location.

Further, the present disclosure describes a method for facilitating real-time musical collaboration, wherein the method comprises using a server to provide a platform for users to create and join jam spaces, wherein the server uses machine learning or artificial intelligence to provide hints to users on how to select musical elements that will combine well with the selections of others.

Further, in some embodiment, the disclosed system may include a client device that enables any musician to synchronize with others in real-time, despite the absence of a studio 'click track', a shared device, or a conductor/orchestra setup.

Further, by leveraging the Real Time Quantization (RTQ) algorithm and the jam server's API, the Universal Metronome (UM) and Universal Looper (UL) may enable any musician to synchronize with others in real time, regardless of their location or the absence of a shared device or a conductor/orchestra setup. This opens up new possibilities for large-scale musical performances, such as a composition played for runners along a marathon route, where each runner passes the nearest N musicians along the route, and the music they hear never misses a beat.

The Universal Metronome (UM) may be a client device that enables any musician to synchronize with others in real time. Like traditional metronomes, the UM signals the player using a click, a buzz, or a flashing light, enabling the musician to play along with a tempo. However, unlike traditional metronomes, the UM consults the jam server's API to discover the tempo, count, and possibly other musical properties of the jam space and then schedules its signals using the RTQ algorithm. If no existing jam is discovered, the UM can register a new jam with desired musical properties for other players to discover.

The Universal Looper (UL) may be a client device that enables any musician to record and play looping segments in synchronization with others in real time. Like traditional loopers, the UL allows a musician to record a musical segment, and then have the device play the segment back indefinitely. However, unlike traditional loopers, the UL consults the jam server's API to discover the tempo, count, and possibly other musical properties of the jam space and then schedules its signals using the RTQ algorithm.

By using the UM and UL, the musicians may participate in performances that are too large to coordinate on tempo visually or audibly. The UM and UL enable the performance of music by a large number of musicians spread over a geographic area. For example, a composition may be played for runners along a marathon route, where each runner passes the nearest N musicians along the route, and the music they hear never misses a beat.

The present disclosure describes a method for facilitating the interactive creation of live music by multiple users, wherein the method may include using a Universal Metronome (UM) or a Universal Looper (UL) that consults a jam server's API to discover the tempo, count, and possibly other musical properties of the jam space, and then schedules its signals using a Real Time Quantization (RTQ) algorithm.

Further, the UM or UL allows a musician to record a musical segment, and then have the device play the segment back indefinitely or only once, as indicated, in tempo with other players.

Further, in some embodiments, the UM or UL enables the performance of music by a large number of musicians spread over a geographic area.

Further, the present disclosure describes a system for facilitating the interactive creation of live music by multiple users, wherein the system may include a Universal Metronome (UM) or a Universal Looper (UL) that consults a jam server's API to discover the tempo, count, and possibly other musical properties of the jam space, and then schedules its signals using a Real Time Quantization (RTQ) algorithm.

Further, in some embodiments, wherein the UM or UL allows a musician to record a musical segment, then have the device play the segment back indefinitely or only once, as indicated.

Social Music to Facilitate Courtship or Social Interaction:

Further, the disclosed system may provide a social music dating platform. Further, the disclosed system allows the users to share lists of their favorite musical elements, such as instrumental loops, and create music together in real time. This not only provides a deeper insight into each user's musical preferences but also facilitates a unique, collaborative experience that can help users connect on a more personal level. This real-time, collaborative aspect of creating music together sets the disclosed system apart from existing music-based social and dating platforms. Further, users can participate in real life, say by creating music together at a bar, using only smartphones, without exchanging contact information.

The present disclosure describes a method of facilitating social connections through the creation of shared music experiences. Further, the method may include enabling users to maintain lists of favorite musical elements, enabling the users to share these lists with others via a URL or QR code, initiating a shared music-creation experience that is spontaneous and musically deeper than sharing song playlists, and allowing the users to share their jam links or QR codes on social media and dating apps.

Further, the disclosed system allows participants who are complete strangers, to make music together without having to exchange any identifying information. So for the dating application, two anonymous strangers might decide to 'break the ice' at a social event by whipping out their phones and each proceeding to select a loop to play. The other user could play a different loop, without ever having to exchange contact information. In real-life dating, this kind of safe interaction might be preferable to pick-up lines, small talk, etc.

Further, in some embodiments, the shared music-creation experience involves the use of a smartphone app that leverages the Real Time Quantization (RTQ) algorithm and the jam server's API.

Further, in some embodiments, the smartphone app provides hints to users about how to choose musical elements that will combine well with the selections of others.

Further, in some embodiments, the app allows users to create shared musical experiences in real time.

Further, in some embodiments, the shared music-creation experience facilitates social connections between users, even complete strangers, in real life.

Further, in some embodiments, the shared music-creation experience provides a novel alternative to traditional icebreaker opening lines in social or dating contexts.

Further, in some embodiments, the shared music-creation experience allows users to explore their musical compatibility and potentially discover shared tastes or intriguing contrasts.

The present disclosure describes a method and apparatus for facilitating crowd-sourced music creation in a venue. The method includes receiving, at the jam server, a request from a user device associated with a user. The request includes a selection of a musical element or loop to be played at the venue. The jam server processes the request and determines whether to add the musical element to a live mix based on a set of criteria. The criteria may include the compatibility of the musical element with the current mix, the appropriateness of the musical element for the venue, and the preferences of the venue host.

Further, in some embodiments, the apparatus includes a jam server configured to receive and process musical element requests, a user device configured to send musical element requests, and a sound system configured to play musical elements from the live mix. The jam server, user device, and sound system are communicatively coupled via a network.

From the perspective of the host, the system provides a unique way to engage customers and enhance the ambiance of the venue. The host may control the list of available musical elements, schedule sets of elements to present over time, and exert control over what can be added to the mix in real time. The host may also include branding elements or advertisements in the mix, creating a unique and engaging customer experience.

From the perspective of the guest, the system provides a unique and engaging way to interact with the venue and other guests. By scanning a QR code or following a link, guests can join the live music creation, selecting musical elements from the host's list and hearing their selections added to the mix in real time. This creates a sense of community and shared experience, enhancing the guest's connection to the venue and other guests.

The system also provides a unique platform for branding and advertising. By incorporating sound elements related to their products or services, the hosts may subtly reinforce their brand and enhance the shopping or dining experience. Musical advertisements, if carefully crafted and well integrated, can also be a fun and novel way to promote products or events. A catchy jingle or a short melodic promotion could be included as part of the musical element selection.

Further, the present disclosure describes a method for facilitating crowd-sourced music creation in a venue, wherein the method may include receiving, at a jam server, a request from a user device associated with a user, the request including a selection of a musical element or loop to be played at the venue, processing the request at the jam server, determining whether to add the musical element to a live mix based on a set of criteria and playing the musical elements from the live mix via a sound system. Further, in some embodiments, the method may include providing a user device configured to send musical element requests and providing a sound system configured to play musical elements from the live mix. Further, in some embodiments, the method may include allowing the user to preview how their selection of musical part would sound against the current mix before asking to join it to the shared venue mix. Further, in some embodiments, the method may include providing a host with the ability to control the list of available musical elements, schedule sets of elements to present over time and exert control over what can be added to the mix in real-time.

Further, in some embodiments, the method may include incorporating branding elements or advertisements in the mix.

Further, in some embodiments, the method may include providing a unique platform for branding and advertising by incorporating sound elements related to a host's products or services into the live mix.

Further, in some embodiments, the method may include providing a user with the ability to scan a QR code or follow a link to join the live music creation.

Further, in some embodiments, the method may include creating a sense of community and shared experience among guests by allowing them to add their selected musical elements to the live mix in real time.

Further, in some embodiments, the method may include enhancing a guest's connection to the venue and other guests by allowing them to hear their selected musical elements added to the live mix in real time.

Further, in some embodiments, the method may include providing a unique and engaging way for guests to interact with the venue and other guests by allowing them to select musical elements from the host's list and add them to the live mix.

Further, in some embodiments, the method may include providing a host with the ability to include branding elements or advertisements in the mix, creating a unique and engaging customer experience.

Further, in some embodiments, the method may include providing a unique platform for branding and advertising by incorporating sound elements related to a host's products or services into the live mix.

Further, in some embodiments, the method may include providing a unique and engaging way for guests to interact with the venue and other guests by allowing the guests to select musical elements from the host's list and add them to the live mix.

Further, in some embodiments, the method may include providing a unique and engaging way for guests to interact with the venue and other guests by allowing them to select musical elements from the host's list and add them to the live mix.

Further, in some embodiments, the method may include providing a host with the ability to control the list of available musical elements, schedule sets of elements to present over time, and exert control over what can be added to the mix in real time.

Further, the disclosed system may be configured to create 'musical action figurines'. Each action figurine may represent a famous musician. For example, an action figurine may be a Bach figurine, loaded with a playlist of famous Bach musical elements.

Further, the disclosed system extends the concept of social music creation to physical objects, specifically musical action figurines. Each musical action figurine represents a famous musician and is loaded with a playlist of that musician's signature musical elements or instrumental parts. When two or more of the musical action figurines are placed in proximity, the figurines may detect each other and begin playing some selection of each figurine's music. Since all figurines synchronize on the same beat, and all music is normalized to the same key and BPM, the users may mix and match their favorite musical heroes, even across genres, to create unique musical combinations. Further, the users may trigger a change of loop in each musical action figurine by shaking it, for example.

This embodiment does not require the use of the jam server API, as long as each device has access to a universal time. If GPS chip clocks are used, the devices need not even connect to the internet. The devices may take the form of tree decorations, rolling balls, or other sculptural objects, expanding the possibilities for user interaction and engagement.

Further, the present disclosure describes a method for facilitating social music creation using physical objects (Musical Action Figurines), wherein the method may include equipping each object with a selection of musical elements associated with a specific musician, enabling the objects to synchronize their musical elements based on a universal time, and allowing the objects to play their musical elements in combination when placed in proximity.

Further, in some embodiments, the physical objects may be action figurines representing famous musicians.

Further, in some embodiments, the physical objects do not require internet connectivity to synchronize and play their musical elements.

Further, in some embodiments, the physical objects can take various forms, including but not limited to, tree decorations, rolling balls, or other sculptural objects.

Further, in some embodiments, the musical elements associated with each object are normalized to the same key and BPM, allowing for harmonious combinations regardless of the specific musicians represented.

The disclosed system enables non-musicians to experience music by creating it, affording a deeper level of understanding and appreciation than just playing entire songs as the unit of musical creation. The disclosed system replaces the element or requirement for skill with the element of judgment. Instead of having to learn how to play an instrument, one only needs to press buttons until they find a track that's a good musical 'match' for the current mix.

Referring now to figures, FIG. 1 is an illustration of an online platform 100 consistent with various embodiments of the present disclosure. By way of non-limiting example, the online platform 100 for facilitating collaborative music creation may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1600.

Figure 2:
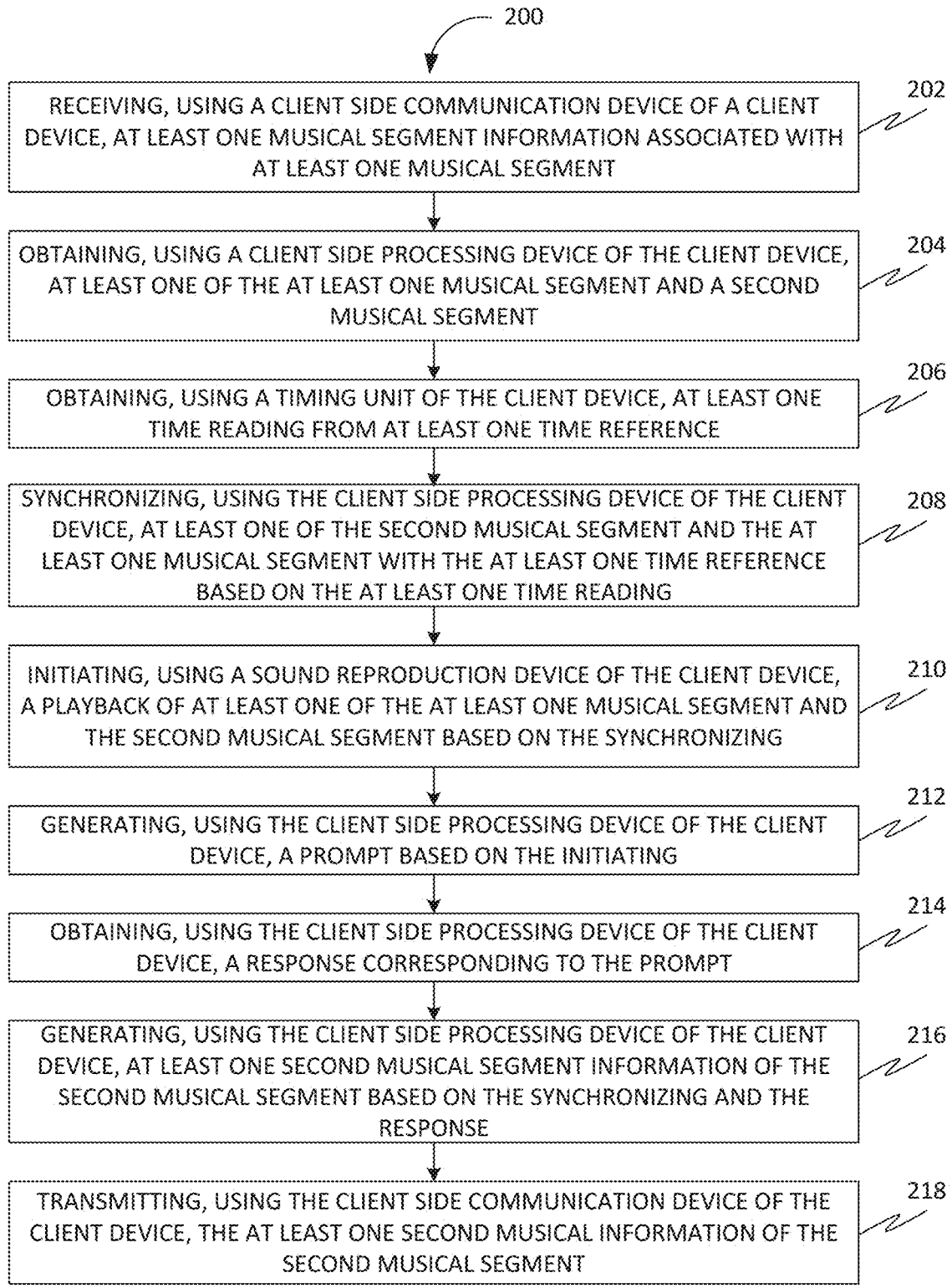
FIG. 2 is a flow chart of a method 200 for facilitating collaborative music creation, in accordance with some embodiments.

FIG. 2 is a flow chart of a method 200 for facilitating collaborative music creation, in accordance with some embodiments. Accordingly, at 202, the method 200 may include receiving, using a client side communication device (such as a client side communication device 1004) of a client device (such as a client device 1002), at least one musical segment information associated with at least one musical segment. Further, the at least one musical segment information may include at least one musical segment indication of the at least one musical segment. Further, the receiving of the at least one musical segment information may include receiving the at least one musical segment information from a server, a computing device such as a smartphone, a tablet, a laptop, and so on, a plurality of client devices, etc. Further, the client device may be a computing device. Further, the at least one musical segment information may include one or more properties (comprising a spatial location) of the at least one musical segment. Further, the one or more properties may include beats, tempos, pitches, phrases, beat starts, phrase starts, measure starts, timestamped beat starts, timestamped measure start, timestamped phrase start, etc. Further, the at least one musical segment may be played in a music creating session. Further, the at least one musical segment information may include a music creating session information of the music creating session comprising a key, a tempo, etc. Further, the at least one musical segment may include at least one musical element. Further, the receiving of the at least one musical segment information may be based on a peer-to-peer communication, a server communication, etc. Further, the at least one musical segment may be a mix.

Further, at 204, the method 200 may include obtaining, using a client side processing device (such as a client side processing device 1006) of the client device, at least one of the at least one musical segment and a second musical segment. Further, the second musical segment may include one or more musical elements. Further, in an embodiment, the obtaining may include identifying the second musical segment from a list of musical segments. Further, the obtaining of the at least one musical segment may be based on the at least one musical segment indication. Further, in an embodiment, the second musical segment may be stored in the client device. Further, the obtaining of the second musical segment may be based on a second musical segment indication received at an input device of the client device. Further, in an embodiment, the second musical segment may be captured using a microphone of the client device. Further, in an embodiment, the second musical segment may be received through an audio interface comprising line inputs of the client device.

Further, at 206, the method 200 may include obtaining, using a timing unit (such as a timing unit 1008) of the client device, at least one time reading of at least one time reference. Further, the at least one time reading may be in microseconds. Further, the at least one time reading may be a timestamp. Further, the at least one time reference may include a coordinated universal time (UTC), a Global Positioning System (GPS) Time, Network Time Protocol (NTP) Servers time, Internet Time Servers time, etc. Further, the at least one time reference may be a shared time reference by a plurality of client devices, a universal time, etc. Further, the obtaining may include capturing, recording, receiving, etc., the at least one time reading from at least one time source. Further, the at least one time source may include a Global Positioning System (GPS), GLONASS, NTP server, etc. Further, the timing unit may include a GPS receiver, a GLONASS receiver, a polling device (poller), etc. Further, the polling device polls the server (NTP server) for the obtaining of the at least one time reading.

Further, at 208, the method 200 may include synchronizing, using the client side processing device of the client device, at least one of the second musical segment and the at least one musical segment with the at least one time reference based on the at least one time reading. Further, the synchronizing may include aligning a beat of at least one of the at least one musical segment and the second musical segment with the at least one time reference in a uniform way. Further, the aligning of the beat corresponds to a uniform mapping of the beat to a timeline defined by the at least one time reading.

Further, at 210, the method 200 may include initiating, using a sound reproduction device (such as a sound reproduction device 1010) of the client device, a playback of at least one of the at least one musical segment and the second musical segment based on the synchronizing. Further, the initiating of the playback of at least one of the at least one musical segment and the second musical segment provides a preview of the second musical segment mixed with the at least one musical segment. Further, the at least one musical segment may be a mix played in a music creating session (Jam space or Jam session).

Further, at 212, the method 200 may include generating, using the client side processing device of the client device, a prompt based on the initiating of the playback. Further, the prompt may be a join prompt. Further, the join prompt may be affirmed at any point during the playback at least one of the at least one musical segment and the second musical segment. Further, the prompt may provide an option to mix the second musical segment with the at least one musical segment, an option to not mix the second musical segment with the at least one musical segment, etc. Further, the prompt may be displayed using an output device of the client device.

Further, at 214, the method 200 may include obtaining, using the client side processing device of the client device, a response corresponding to the prompt. Further, the response further corresponds to the option.

Further, at 216, the method 200 may include generating, using the client side processing device of the client device, at least one second musical segment information of the second musical segment based on the synchronizing and the response.

Further, at 218, the method 200 may include transmitting, using the client side communication device of the client device, the at least one second musical segment information of the second musical segment. Further, the transmitting of the at least one second musical segment information may include transmitting the at least one second musical segment information to the server, the computing device such as a smartphone, a tablet, a laptop, and so on, the plurality of client devices, etc. Further, the client device may be a computing device. Further, the aligning of the beat of at least one of the at least one musical segment and the second musical segment with the at least one time reference in the uniform way adjusts one or more musical properties of at least one of the at least one musical segment and the second musical segment with the at least one time reference. Further, the generating of the at least one second musical segment information may include generating one or more adjusted properties of the second musical segment. Further, the at least one second musical segment information may include the one or more adjusted properties of the second musical segment. Further, the one or more adjusted properties may include tempos, pitches, phrases, beat starts, phrase starts, measure starts, timestamped beat starts, timestamped measure start, timestamped phrase start, etc. Further, the second musical segment may include at least one musical element. Further, the at least one second musical segment information may include a second musical segment indication. Further, the transmitting of the at least one second musical segment information may be based on the peer-to-peer communication, the server communication, etc.

Further, in some embodiments, the method 200 may include analyzing, using the client side processing device of the client device, the second musical segment. Further, the method 200 may include obtaining, using the client side processing device of the client device, at least one metadata of the second musical segment based on the analyzing of the second musical segment. Further, the at least one metadata of the second musical segment may include a tempo and a count for the second musical segment. Further, the method 200 may include analyzing, using the client side processing device of the client device, the at least one musical segment information and the at least one metadata using a real time quantization (RTQ) algorithm. Further, the RTQ algorithm aligns a tempo of at least one of the at least one musical segment and the second musical segment to a universal tempo mapped by calculating a function, to a universal timeline defined by the at least one time reading. Further, the synchronization may be based on the analyzing of the at least one musical segment information and the at least one metadata.

In further embodiments, the method 200 may include detecting, using a sensor (such as a sensor 1502) of the client device, a presence of at least one client device proximal to the client device. Further, the receiving of the at least one musical segment information may be based on the detecting of the presence. Further, the sensor may include a proximity sensor for the at least one client device. Further, the client device may be comprised in a physical object such as a figurine (such as an action figurine, a musical action figurine, etc.). Further, the at least one client device may be comprised in at least one physical object such as the figurine. Further, the at least one musical segment information may include at least one indication indicating a generating of the at least one musical segment stored in the at least one client device by the at least one client device. Further, the client device generates the second musical segment stored in the client device. Further, the at least one musical segment may be associated with at least one artist (such as a famous musician). Further, the second musical segment may be associated with a second artist (such as a musician).

Figure 3:
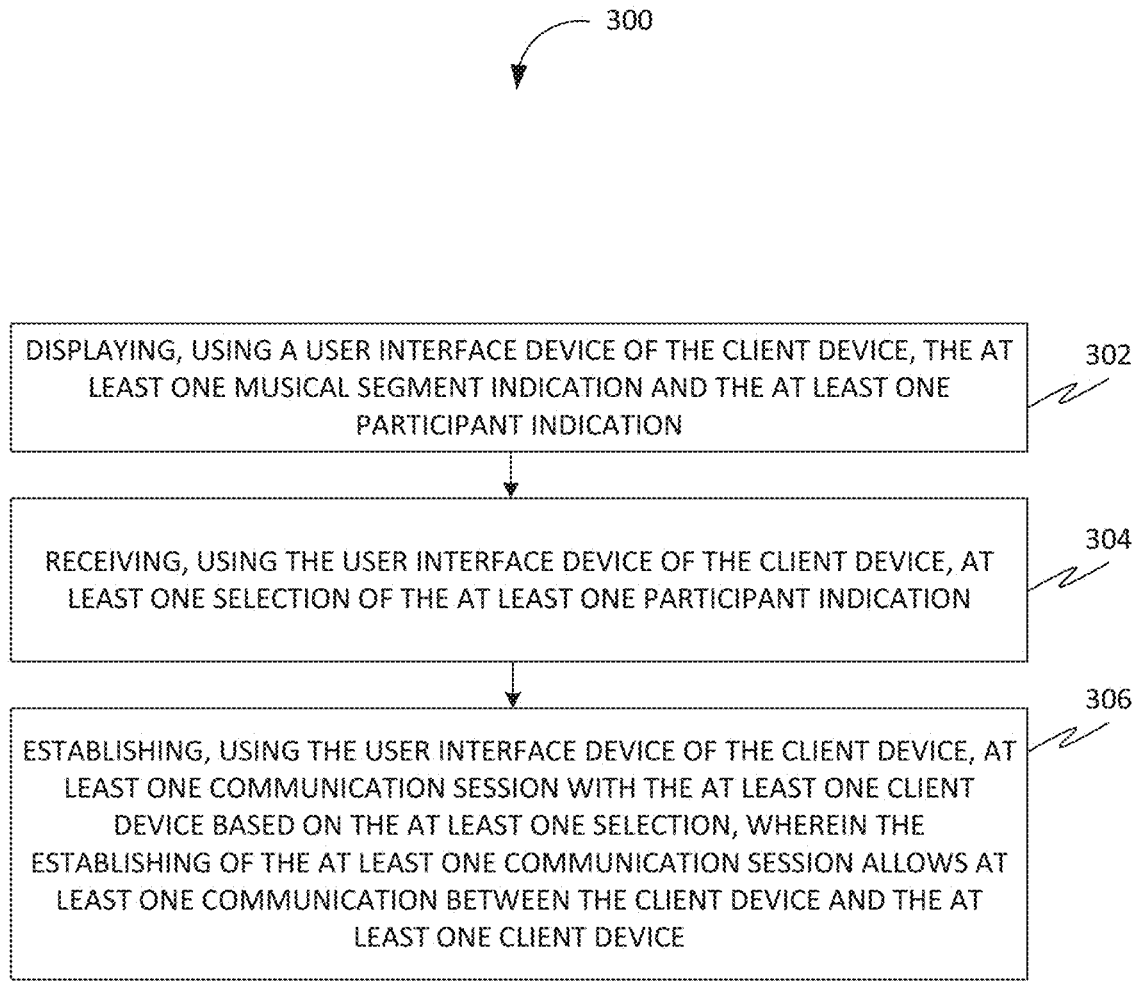
FIG. 3 is a flow chart of a method 300 for facilitating collaborative music creation, in accordance with some embodiments.

FIG. 3 is a flow chart of a method 300 for facilitating collaborative music creation, in accordance with some embodiments. Further, the client device may be associated with a participant of a music creating session. Further, the music creating session may be a Jam session. Further, the at least one musical segment may be played using at least one client device associated with at least one participant of the music creating session, in the music creating session. Further, the at least one musical segment information may include at least one musical segment indication of the at least one musical segment and at least one participant indication of the at least one participant.

Further, at 302, the method 300 may include displaying, using a user interface device of the client device, the at least one musical segment indication and the at least one participant indication.

Further, at 304, the method 300 may include receiving, using the user interface device of the client device, at least one selection of the at least one participant indication the participant.

Further, at 306, the method 300 may include establishing, using the user interface device of the client device, at least one communication session with the at least one client device based on the at least one selection. Further, the establishing of the at least one communication session allows at least one communication between the client device and the at least one client device. Further, the user interface device may include a display device, a communication interface, and an input device.

Further, in an embodiment, the at least one participant indication may include at least one location indication corresponding to at least one location of the at least one participant and at least one identification indication corresponding to at least one identification of the at least one participant. Further, the method 300 may include locating, using the client side processing device of the client device, the at least one participant on at least one map based on the at least one location indication. Further, the method 300 may include generating, using the client side processing device of the client device, at least one map representation comprising at least one of the at least one identification indication of the at least one participant in the at least one location, the at least one location indication of the at least one participant, and the at least one musical segment indication associated with the at least one participant based on the locating, the at least one participant indication, and the at least one musical segment indication. Further, the displaying of the at least one musical segment indication and the at least one participant indication may include displaying the at least one map representation.

Figure 4:
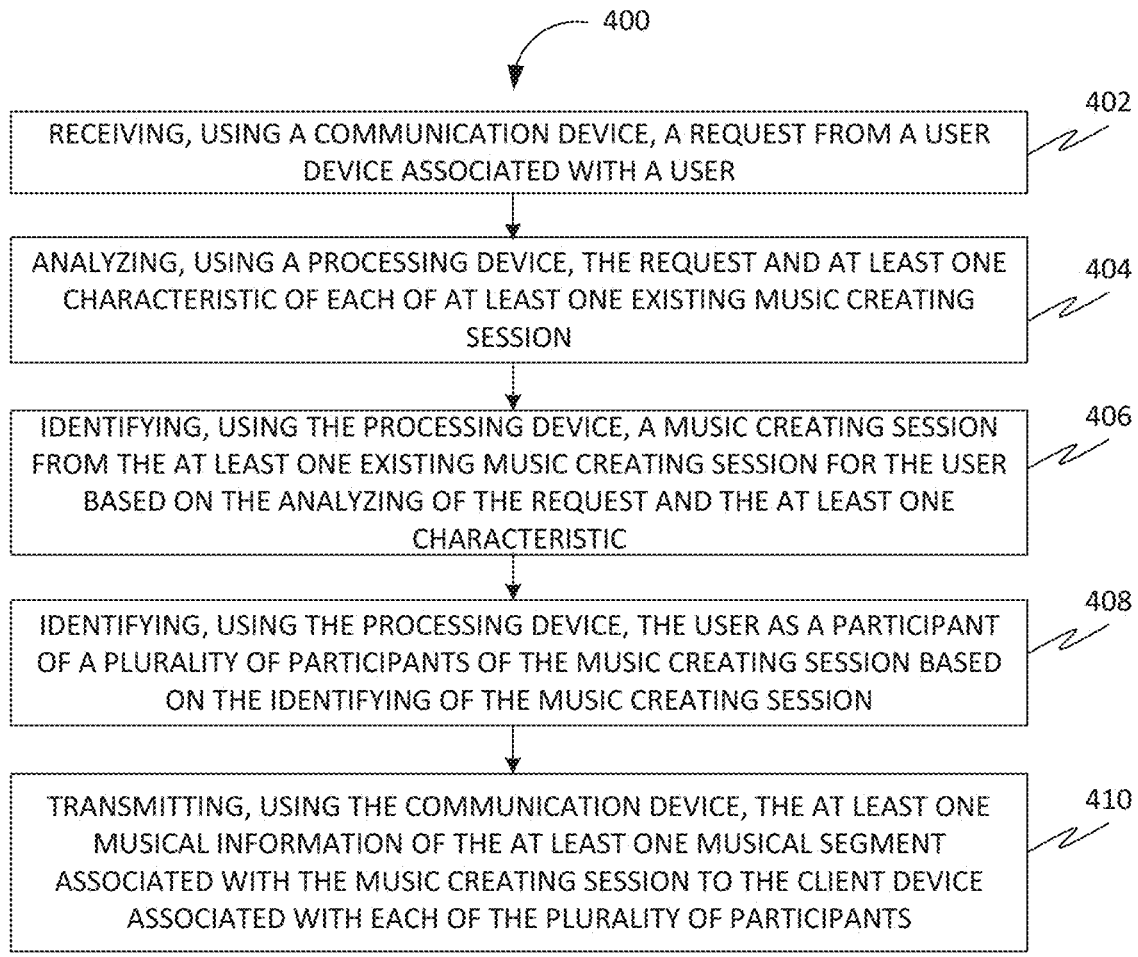
FIG. 4 is a flow chart of a method 400 for facilitating collaborative music creation, in accordance with some embodiments.

FIG. 4 is a flow chart of a method 400 for facilitating collaborative music creation, in accordance with some embodiments. Accordingly, at 402, the method 400 may include receiving, using a communication device (such as a communication device 1102), a request from a user device (such as a user device 1106) associated with a user. Further, the request may include a request to join at least one existing music creating session associated with a server comprised of the communication device. Further, the request may include an access key/password, a geographic location, a user identifier, a user preference (comprising a genre), a time, etc. Further, the server may provide at least one application programming interface (API) to query for the at least one existing music creating session associated with the server.

Further, the user device may include a client device, a computing device, etc. Further, the receiving of the request may include receiving the request from the user device using the at least one API.

Further, at 404, the method 400 may include analyzing, using a processing device (such as a processing device 1104), the request and at least one characteristic of each of at least one existing music creating session. Further, the at least one characteristic may include at least one musical property of at least one music comprised of at least one musical segment played in the at least one existing music creating session, at least one inclusion rule for the at least one existing music creating session, etc. Further, the at least one musical property may include a tempo, a count, a key, a genre, a session schedule, etc. Further, the at least one inclusion rule may include a maximum number of participants, a geographic radius, an access key/password, etc. Further, the analyzing may include matching the user to the at least one existing music creating session based on the request and the at least one characteristic of each of the at least one existing music creating session. Further, the at least one existing music creating session may be a default jam space provided by the server.

Further, at 406, the method 400 may include identifying, using the processing device, a music creating session from the at least one existing music creating session for the user, based on the analyzing of the request and the at least one characteristic. Further, the music creating session satisfies the user's preference. Further, the identifying may include selecting the music creating session from the at least one existing music creating session for the user based on the matching.

Further, at 408, the method 400 may include identifying, using the processing device, the user as a participant of a plurality of participants of the music creating session based on the identifying of the music creating session.

Further, at 410, the method 400 may include transmitting, using the communication device, the at least one musical segment information of the at least one musical segment associated with the music creating session to the client device associated with each of the plurality of participants. Further, the at least one musical segment information may include at least one musical property such as a tempo, a count, a beat, etc. of the music and at least one music playing characteristic such as a repetition, a volume, a spatial positioning, etc., of the at least one musical segment.

Figure 5:
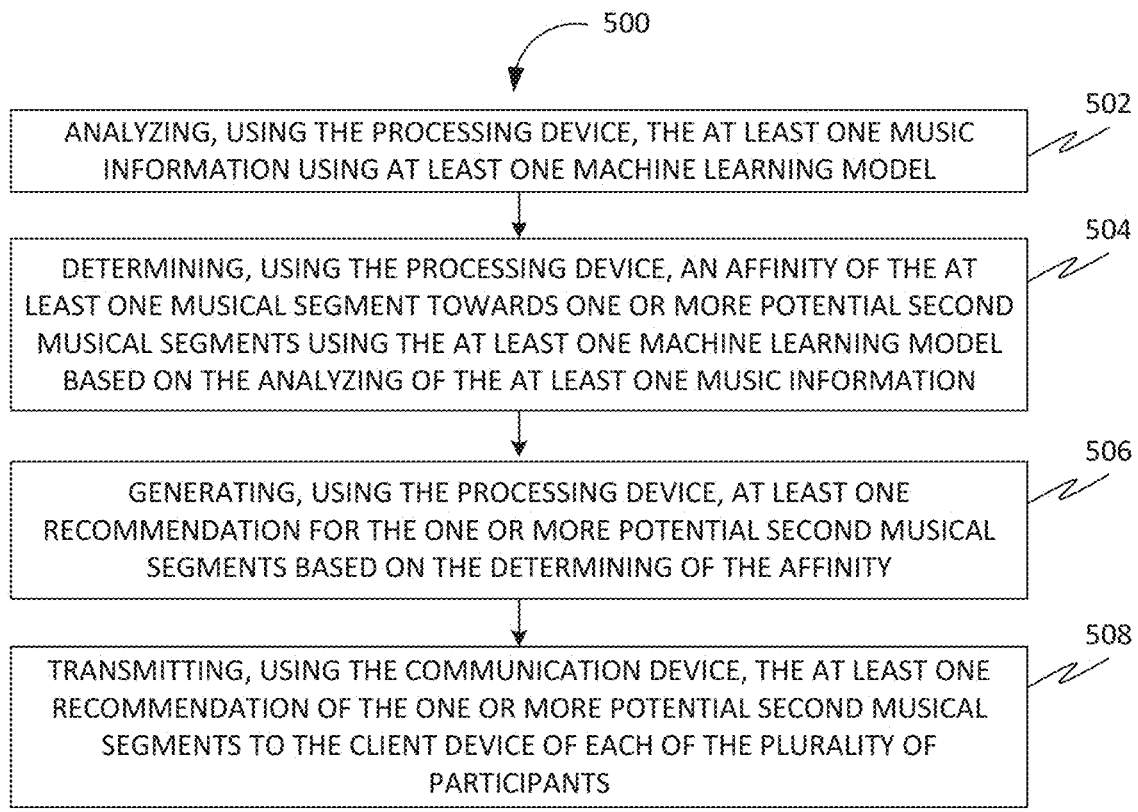
FIG. 5 is a flow chart of a method 500 for facilitating collaborative music creation, in accordance with some embodiments.

FIG. 5 is a flow chart of a method 500 for facilitating collaborative music creation, in accordance with some embodiments. Accordingly, at 502, the method 500 may include analyzing, using the processing device, the at least one music information using at least one machine learning model. Further, the at least one machine learning model may be trained using a dataset comprising a plurality of music information of a plurality of musical segments. Further, the at least one machine learning model may be configured for identifying a plurality of second musical segments with a plurality of degrees of affinity towards the plurality of musical segments.

Further, at 504, the method 500 may include determining, using the processing device, an affinity of the at least one musical segment towards one or more potential second musical segments using the at least one machine learning model based on the analyzing of the at least one music information.

Further, at 506, the method 500 may include generating, using the processing device, at least one recommendation for the one or more potential second musical segments based on the determining of the affinity.

Further, at 508, the method 500 may include transmitting, using the communication device, the at least one recommendation of the one or more potential second musical segments to the client device of each of the plurality of participants. Further, the one or more potential second musical segments may be potentially compatible musical segments. Further, the client device may be configured for presenting, using a presenting device (such as a presenting device 1202) of the client device, the at least one recommendation. Further, the obtaining may include obtaining the second musical segment from the one or more potential second musical segments based on the at least one recommendation.

Figure 6:
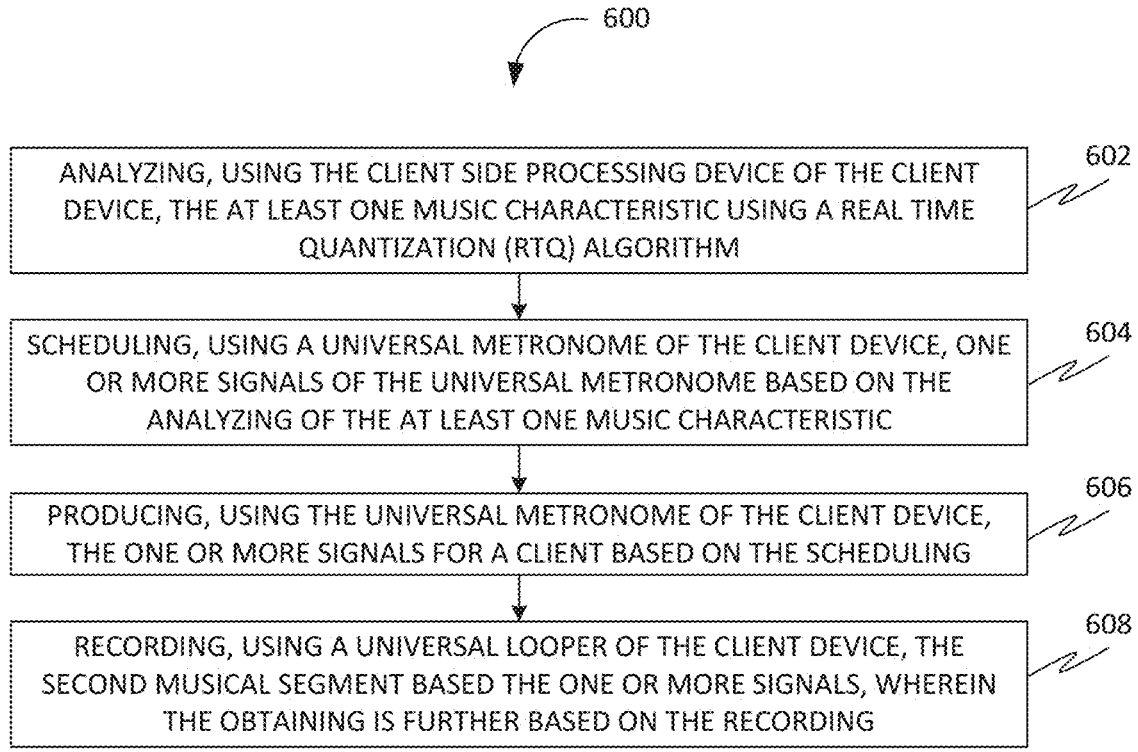
FIG. 6 is a flow chart of a method 600 for facilitating collaborative music creation, in accordance with some embodiments.

FIG. 6 is a flow chart of a method 600 for facilitating collaborative music creation, in accordance with some embodiments. Accordingly, the at least one music information may include at least one musical characteristic of the music.

Further, at 602, the method 600 may include analyzing, using the client side processing device of the client device, the at least one musical characteristic using a known feature extraction algorithm. Further, the at least one music characteristic may include a tempo, a count, a beat, etc. of the music and/or one or more musical segments comprising the music.

Further, at 604, the method 600 may include scheduling, using a universal metronome (such as a universal metronome 1302) of the client device, one or more signals of the universal metronome based on the analyzing of the at least one music characteristic. Further, the scheduling may include determining a time of production of the one or more signals. Further, the one or more signals may include a sound signal, a light signal, a haptic signal, etc.

Further, at 606, the method 600 may include producing, using the universal metronome of the client device, the one or more signals for a client based on the scheduling.

Further, at 608, the method 600 may include recording, using a universal looper (such as a universal looper 1304) of the client device, the second musical segment based the one or more signals. Further, the obtaining may be based on the recording.

Figure 7:
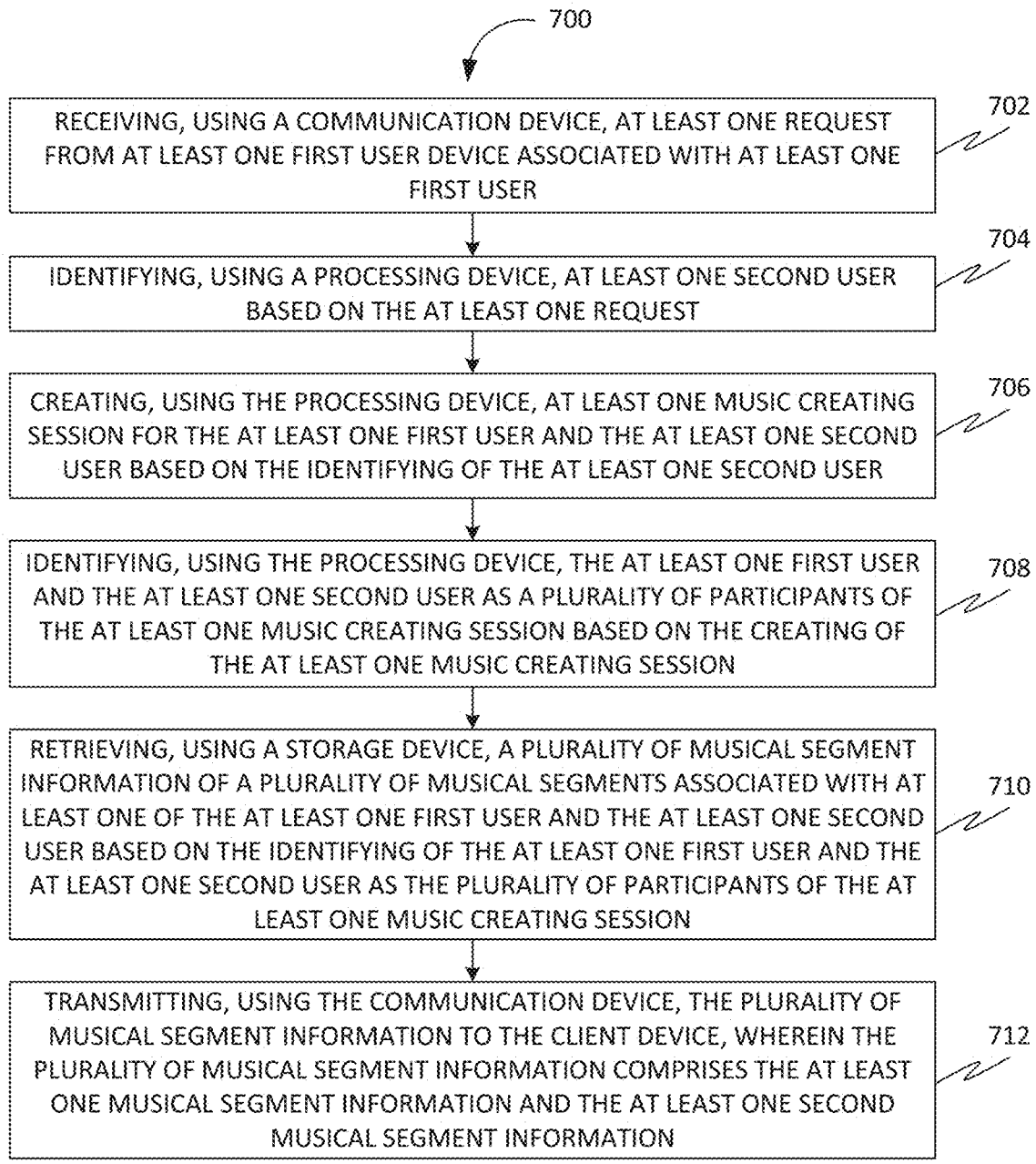
FIG. 7 is a flow chart of a method 700 for facilitating collaborative music creation, in accordance with some embodiments.

FIG. 7 is a flow chart of a method 700 for facilitating collaborative music creation, in accordance with some embodiments. Accordingly, at 702, the method 700 may include receiving, using a communication device, at least one request from at least one first user device (such as at least one first user device 1108) associated with at least one first user. Further, the at least one first user device may include a client device, a computing device, etc. Further, the at least one request may include a first user characteristic, a user preference, etc.

Further, at 704, the method 700 may include identifying, using a processing device, at least one second user based on the at least one request. Further, the identifying may include matching the at least one first user to the at least one second user based on the first user's characteristic, the first user's preference, etc.

Further, at 706, the method 700 may include creating, using the processing device, at least one music creating session for the at least one first user and the at least one second user based on the identifying of the at least one second user.

Further, at 708, the method 700 may include identifying, using the processing device, the at least one first user and the at least one second user as a plurality of participants of the at least one music creating session based on the creating of the at least one music creating session. Further, the at least one first user and the at least one second user may interact by collaboratively creating music in the at least one music creating session. Further, the collaboratively creating music in the at least one music creating session may allow the at least one first user and the at least one second user to have a shared music creation experience.

Further, at 710, the method 700 may include retrieving, using a storage device, a plurality of musical segment information of a plurality of musical segments associated with at least one of the at least one first user and the at least one second user based on the identifying of the at least one first user and the at least one second user as the plurality of participants of the at least one music creating session. Further, the at least one musical segment information may include at least one indication of the at least one musical segment. Further, the at least one musical segment may be a favorite of at least one of the at least one first user and the at least one second user.

Further, at 712, the method 700 may include transmitting, using the communication device, the plurality of musical segment information to the client device. Further, the plurality of musical segment information may include the at least one musical segment information and the at least one second musical segment information.

Figure 8:
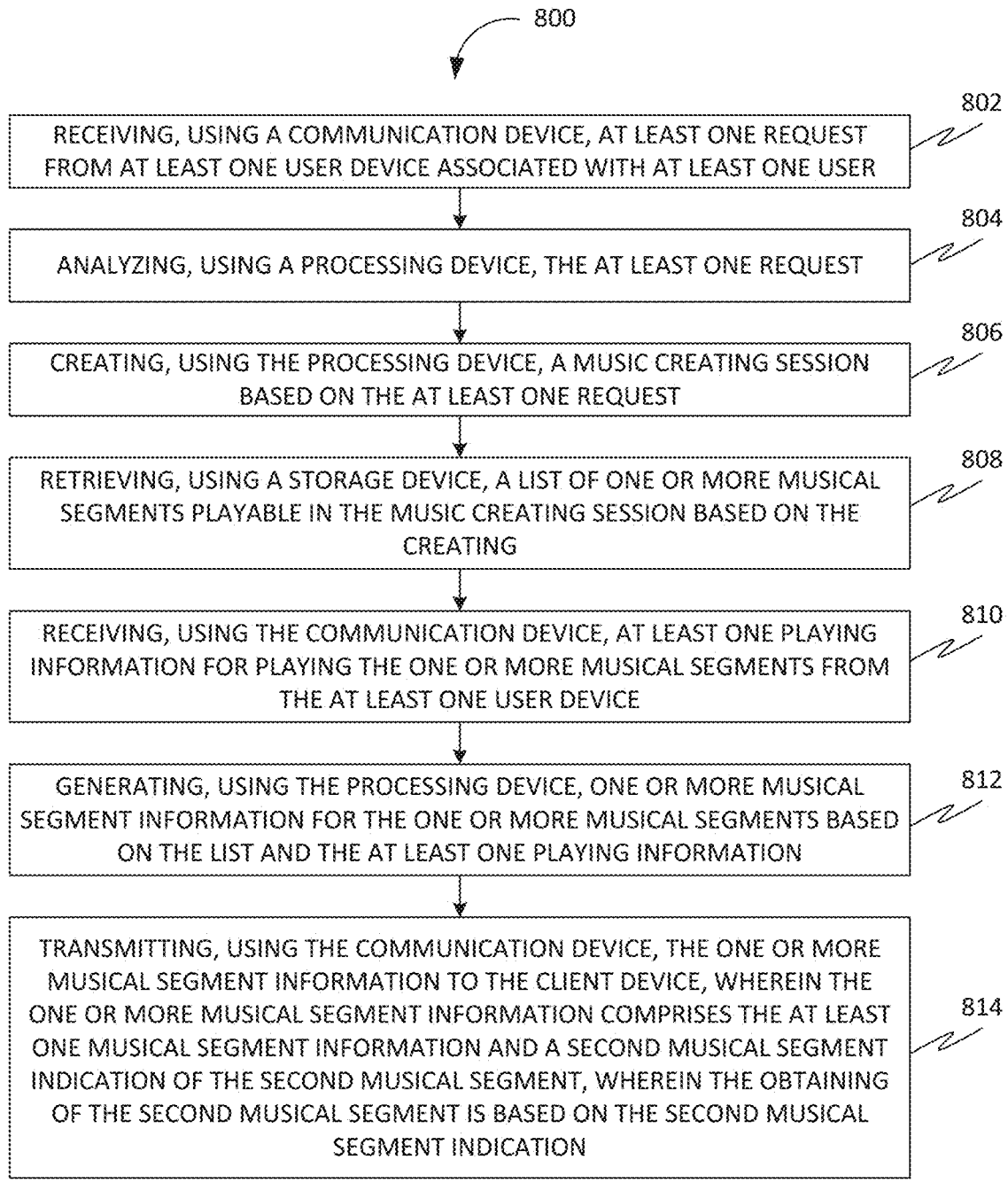
FIG. 8 is a flow chart of a method 800 for facilitating collaborative music creation, in accordance with some embodiments.

FIG. 8 is a flow chart of a method 800 for facilitating collaborative music creation, in accordance with some embodiments. Accordingly, at 802, the method 800 may include receiving, using a communication device, at least one request from at least one user device (such as at least one user device 1110) associated with at least one user. Further, the at least one request may include a request for hosting a music creating session. Further, the at least one user may be a host of the music creating session. Further, the at least one user device may include a client device, a computing device, etc.

Further, at 804, the method 800 may include analyzing, using a processing device, the at least one request.

Further, at 806, the method 800 may include creating, using the processing device, a music creating session based on the at least one request.

Further, at 808, the method 800 may include retrieving, using a storage device (such as a storage device 1402), a list of one or more musical segments playable in the music creating session based on the creating.

Further, at 810, the method 800 may include receiving, using the communication device, at least one playing information for playing the one or more musical segments from the at least one user device. Further, the at least one playing information may include at least one playing criterion for playing the one or more musical segments in the music creating session. Further, the at least one playing criterion may include an order, a duration, a repetition, etc. of the one or more musical segments.

Further, at 812, the method 800 may include generating, using the processing device, one or more musical segment information for the one or more musical segments based on the list and the at least one playing information.

Further, at 814, the method 800 may include transmitting, using the communication device, the one or more musical segment information to the client device. Further, the one or more musical segment information may include the at least one musical segment information and a second musical segment indication of the second musical segment. Further, the obtaining of the second musical segment may be based on the second musical segment indication.

Figure 9:
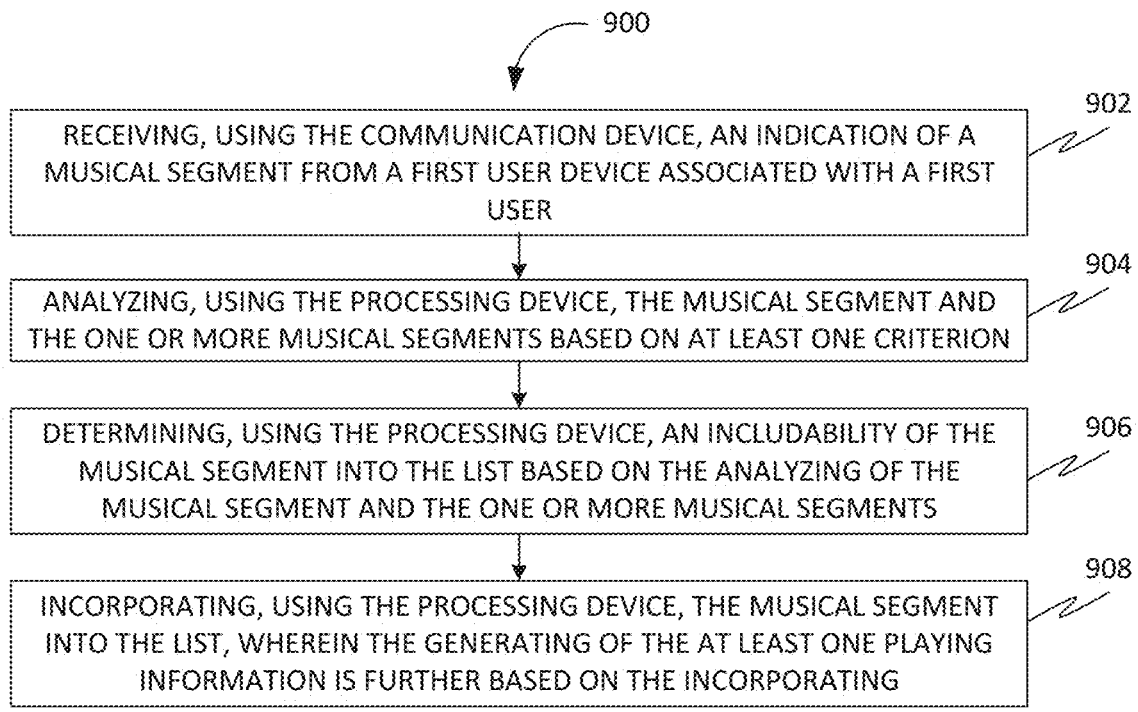
FIG. 9 is a flow chart of a method 900 for facilitating collaborative music creation, in accordance with some embodiments.

FIG. 9 is a flow chart of a method 900 for facilitating collaborative music creation, in accordance with some embodiments. Accordingly, at 902, the method 900 may include receiving, using the communication device, an indication of a musical segment from a first user device (such as a first user device 1112) associated with a first user. Further, the first user may be a guest of the music creating session.

Further, at 904, the method 900 may include analyzing, using the processing device, the musical segment and the one or more musical segments based on at least one criterion.

Further, at 906, the method 900 may include determining, using the processing device, an includability of the musical segment into the list based on the analyzing of the musical segment and the one or more musical segments.

Further, at 908, the method 900 may include incorporating, using the processing device, the musical segment into the list. Further, the generating of the at least one playing information may be based on the incorporating.

Figure 10:
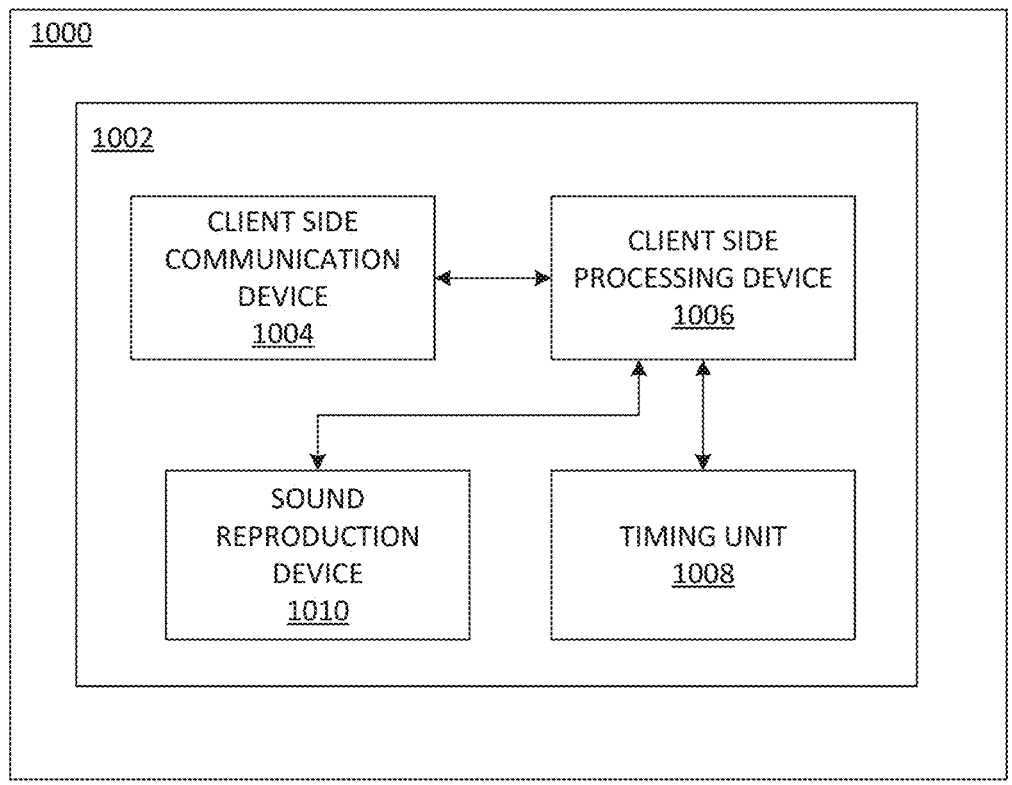
FIG. 10 is a block diagram of a system 1000 for facilitating collaborative music creation, in accordance with some embodiments.

FIG. 10 is a block diagram of a system 1000 for facilitating collaborative music creation, in accordance with some embodiments. Further, the system 1000 may include a client device 1002.

Further, the client device 1002 may include a client side communication device 1004 configured for receiving at least one musical segment information associated with at least one musical segment. Further, the client side communication device 1004 may be configured for transmitting at least one second musical segment information of a second musical segment.

Further, the client device 1002 may include a timing unit 1008 configured for obtaining at least one time reading of at least one time reference.

Further, the client device 1002 may include a client side processing device 1006 communicatively coupled with the client side communication device 1004 and the timing unit 1008. Further, the client side processing device 1006 may be configured for obtaining at least one of the at least one musical segment and the second musical segment. Further, the client side processing device 1006 may be configured for synchronizing at least one of the second musical segment and the at least one musical segment with the at least one time reference based on the at least one time reading. Further, the synchronizing may include aligning a beat of at least one of the at least one musical segment and the second musical segment with the at least one time reference in a uniform way. Further, the client side processing device 1006 may be configured for generating a prompt. Further, the client side processing device 1006 may be configured for obtaining a response corresponding to the prompt. Further, the client side processing device 1006 may be configured for generating the at least one second musical segment information of the second musical segment based on the synchronizing and the response.

Further, the client device 1002 may include a sound reproduction device 1010 communicatively coupled with the client side processing device 1006. Further, the sound reproduction device 1010 may be configured for initiating a playback of at least one of the at least one musical segment and the second musical segment based on the synchronizing. Further, the generating of the prompt may be based on the initiating of the playback.

Figure 12:
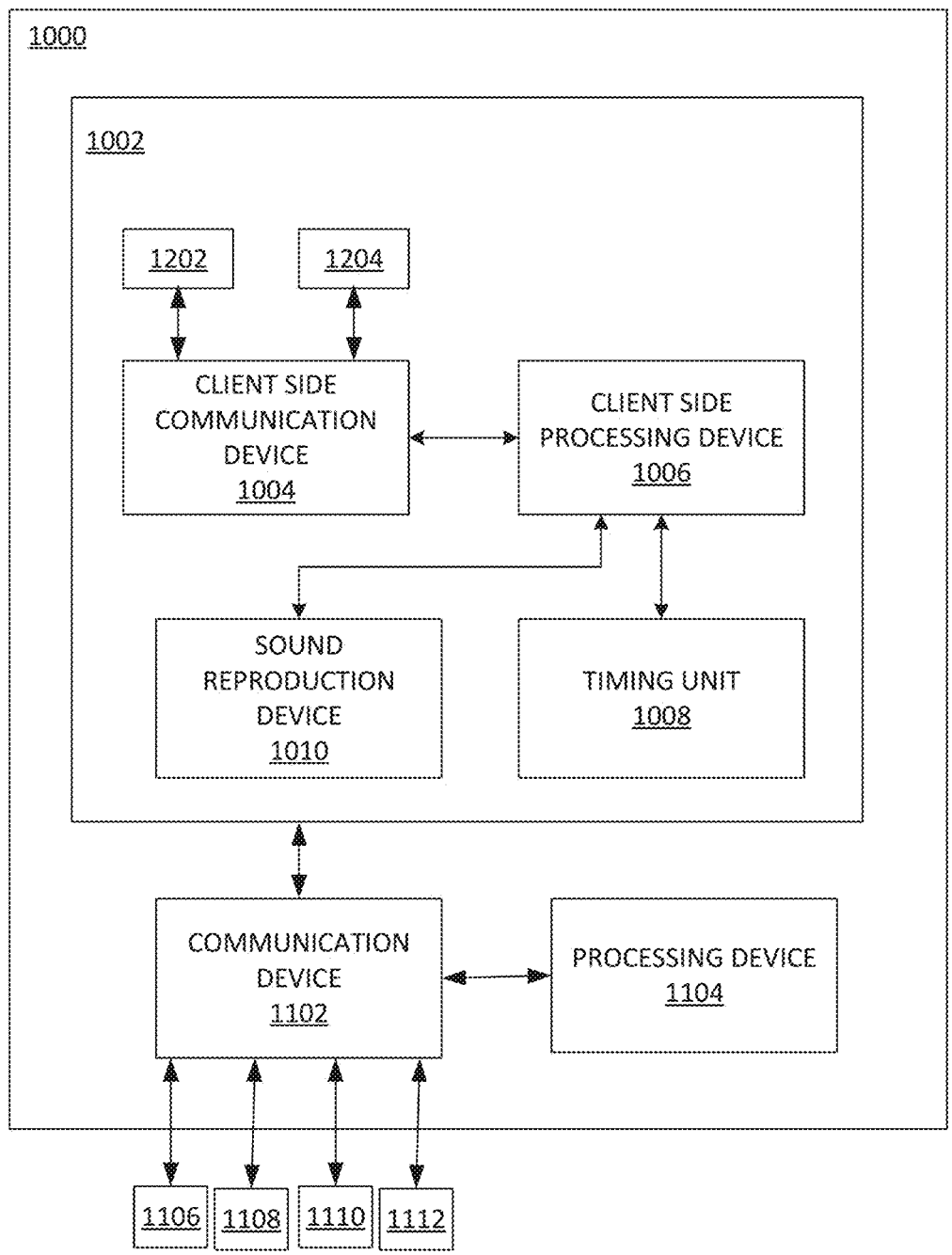
FIG. 12 is a block diagram of the system 1000 for facilitating collaborative music creation, in accordance with some embodiments.

Further, in some embodiments, the client device 1002 may be associated with a participant of a music creating session. Further, the at least one musical segment may be played using at least one client device associated with at least one participant of the music creating session, in the music creating session. Further, the at least one musical segment information may include at least one musical segment indication of the at least one musical segment and at least one participant indication of the at least one participant. Further, the client device 1002 may include a user interface device 1204, as shown in FIG. 12, communicatively coupled with the client side communication device 1004. Further, the user interface device 1204 may be configured for displaying the at least one musical segment indication and the at least one participant indication. Further, the user interface device 1204 may be configured for receiving at least one selection of the at least one participant indication. Further, the user interface device 1204 may be configured for establishing at least one communication session with the at least one client device based on the at least one selection. Further, the establishing of the at least one communication session allows at least one communication between the client device 1002 and the at least one client device. Further, the user interface device 1204 may include a display device, a communication interface, and an input device.

Further, in an embodiment, the at least one participant indication may include at least one location indication corresponding to at least one location of the at least one participant and at least one identification indication corresponding to at least one identification of the at least one participant. Further, the client side processing device 1006 may be configured for locating the at least one participant on at least one map based on the at least one location indication. Further, the client side processing device 1006 may be configured for generating at least one map representation comprising at least one of the at least one identification indication of the at least one participant in the at least one location, the at least one location indication of the at least one participant, and the at least one musical segment indication associated with the at least one participant based on the locating, the at least one participant indication, and the at least one musical segment indication. Further, the displaying of the at least one musical segment indication and the at least one participant indication may include displaying the at least one map representation.

Further, in some embodiments, the client side processing device 1006 may be configured for analyzing the second musical segment. Further, the client side processing device 1006 may be configured for obtaining at least one metadata of the second musical segment. Further, the client side processing device 1006 may be configured for analyzing the at least one musical segment information, the at least one metadata, and the at least one time reading using a real time quantization (RTQ) algorithm. Further, the synchronizing is further based on the analyzing of the at least one musical segment information, the at least one metadata, and the at least one time reading using the real time quantization (RTQ) algorithm. Further, the client side processing device 1006 may be configured for loading the second musical segment based on the analyzing of the at least one musical segment information, the at least one metadata, and the at least one time reading. Further, the initiating of the playback of at least one of the at least one musical segment and the second musical segment may be further based on the loading.

Further, in some embodiments, the client side processing device 1006 may be configured for analyzing the second musical segment. Further, the client side processing device 1006 may be configured for obtaining at least one metadata of the second musical segment based on the analyzing of the second musical segment. Further, the client side processing device 1006 may be configured for analyzing the at least one musical segment information and the at least one metadata using a real time quantization (RTQ) algorithm. Further, the RTQ algorithm aligns a tempo of at least one of the at least one musical segment and the second musical segment to a universal tempo mapped by calculating a function, to a universal timeline defined by the at least one time reading. Further, the synchronization may be based on the analyzing of the at least one musical segment information and the at least one metadata.

Figure 11:
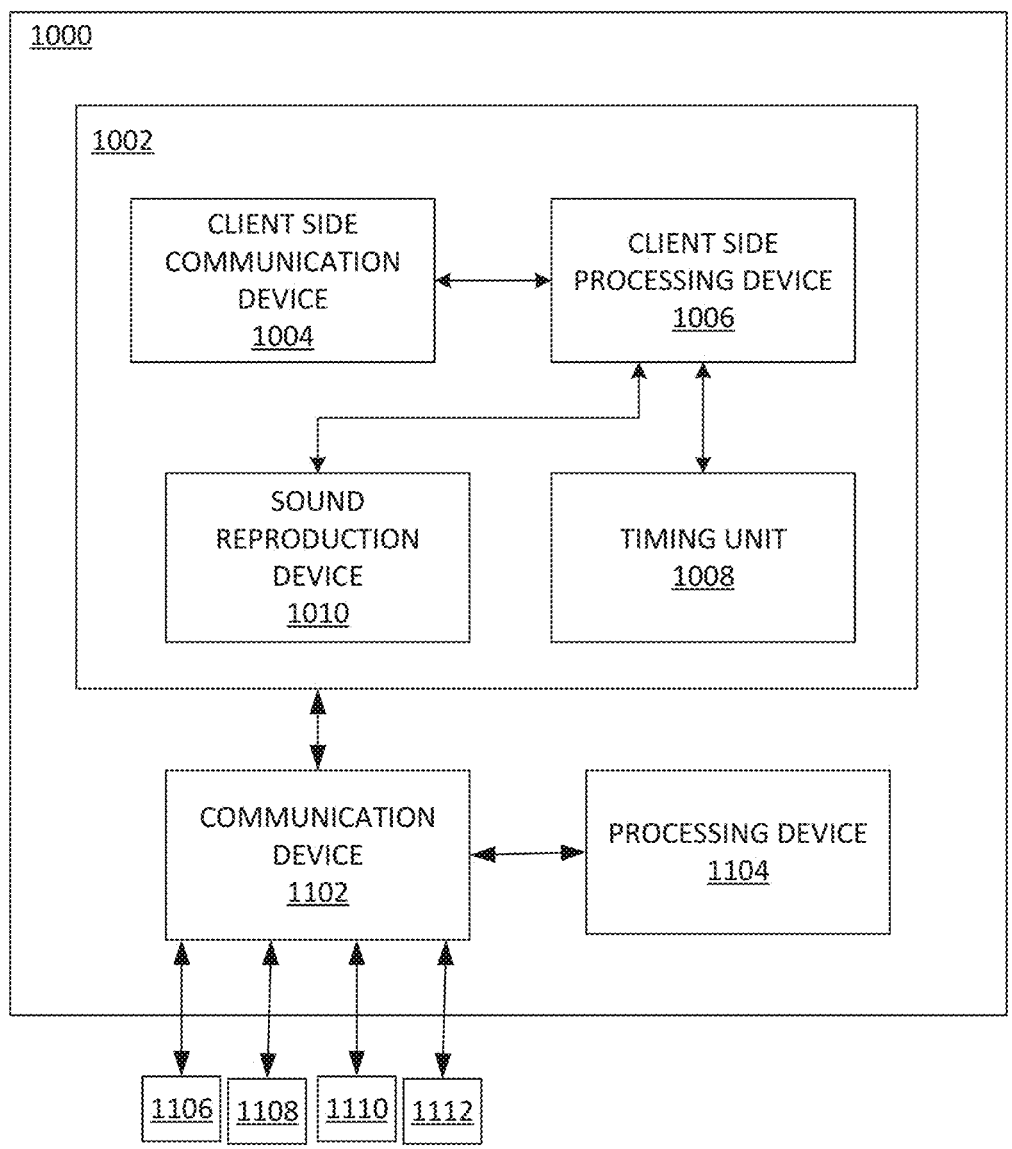
FIG. 11 is a block diagram of the system 1000 for facilitating collaborative music creation, in accordance with some embodiments.

In further embodiments, the system 1000 may include a communication device 1102 (as shown in FIG. 11) configured for receiving a request from a user device 1106 (as shown in FIG. 11) associated with a user. Further, the communication device 1102 may be configured for transmitting the at least one musical segment information of the at least one musical segment associated with a music creating session to the client device 1002 associated with each of a plurality of participants. Further, the system 1000 may include a processing device 1104 (as shown in FIG. 11) communicatively coupled with the communication device 1102. Further, the processing device 1104 may be configured for analyzing the request and at least one characteristic of each of at least one existing music creating session. Further, the processing device 1104 may be configured for identifying the music creating session from the at least one existing music creating session for the user based on the analyzing of the request and the at least one characteristic. Further, the processing device 1104 may be configured for identifying the user as a participant of the plurality of participants of the music creating session based on the identifying of the music creating session.

Further, in some embodiments, the processing device 1104 may be configured for analyzing the at least one music information using at least one machine learning model. Further, the processing device 1104 may be configured for determining an affinity of the at least one musical segment towards one or more potential second musical segments using the at least one machine learning model based on the analyzing of the at least one music information. Further, the processing device 1104 may be configured for generating at least one recommendation for the one or more potential second musical segments based on the determining of the affinity. Further, the communication device 1102 may be configured for transmitting the at least one recommendation of the one or more potential second musical segments to the client device 1002 of each of the plurality of participants. Further, the client device 1002 may include a presenting device 1202 (as shown in FIG. 12) configured for presenting the at least one recommendation. Further, the obtaining may include obtaining the second musical segment from the one or more potential second musical segments based on the at least one recommendation. Further, the presenting device 1202 may be a presentation device, a display device, an output device, etc.

Figure 13:
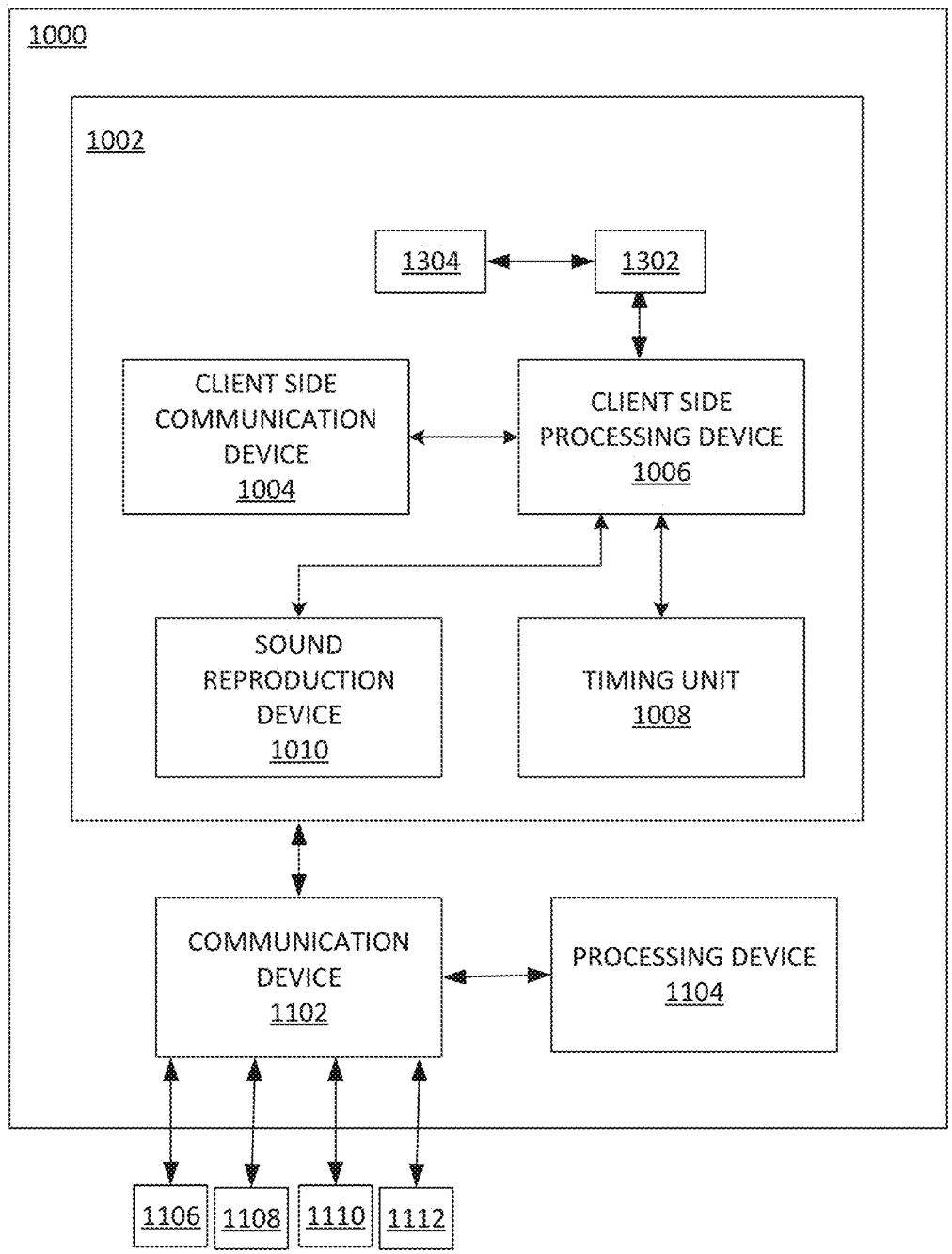
FIG. 13 is a block diagram of the system 1000 for facilitating collaborative music creation, in accordance with some embodiments.

Further, in some embodiments, the at least one music information may include at least one music characteristic of the music. Further, the client side processing device 1006 may be configured for analyzing the at least one music characteristic using a real time quantization (RTQ) algorithm. Further, the client device 1002 may include a universal metronome 1302 (as shown in FIG. 13) communicatively coupled with the client side processing device 1006. Further, the universal metronome 1302 may be configured for scheduling one or more signals of the universal metronome 1302 based on the analyzing of the at least one music characteristic. Further, the universal metronome 1302 may be configured for producing the one or more signals for a client based on the scheduling. Further, the client device 1002 may include a universal looper 1304 (as shown in FIG. 13) communicatively coupled with the universal metronome 1302. Further, the universal looper 1304 may be configured for recording the second musical segment based the one or more signals. Further, the obtaining may be based on the recording.

Figure 14:
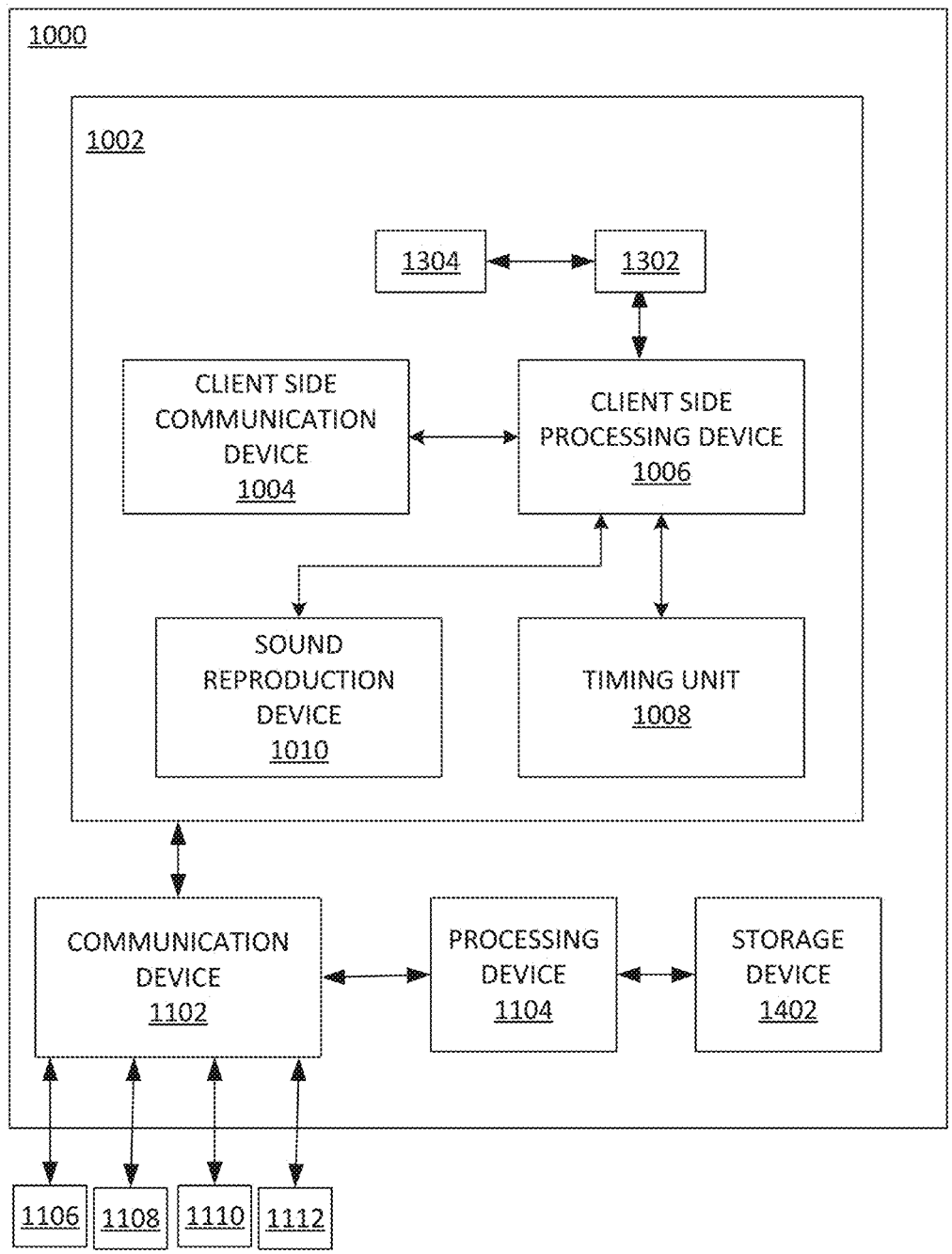
FIG. 14 is a block diagram of the system 1000 for facilitating collaborative music creation, in accordance with some embodiments.

In further embodiments, the communication device 1102 may be configured for receiving at least one request from at least one first user device 1108 (as shown in FIG. 11) associated with at least one first user. Further, the communication device 1102 may be configured for transmitting a plurality of musical segment information to the client device 1002. Further, the processing device 1104 may be configured for identifying at least one second user based on the at least one request. Further, the processing device 1104 may be configured for creating at least one music creating session for the at least one first user and the at least one second user based on the identifying of the at least one second user. Further, the processing device 1104 may be configured for identifying the at least one first user and the at least one second user as a plurality of participants of the at least one music creating session based on the creating of the at least one music creating session. Further, the system 1000 may include a storage device 1402 (as shown in FIG. 14) communicatively coupled with the processing device 1104. Further, the storage device 1402 may be configured for retrieving the plurality of musical segment information of the plurality of musical segments associated with at least one of the at least one first user and the at least one second user based on the identifying of the at least one first user and the at least one second user as the plurality of participants of the at least one music creating session. Further, the plurality of musical segment information may include the at least one musical segment information and the at least one second musical segment information Further, in some embodiments, the communication device 1102 may be configured for receiving at least one request from at least one user device 1110 (as shown in FIG. 11) associated with at least one user. Further, the communication device 1102 may be configured for receiving at least one playing information for playing one or more musical segments from the at least one user device 1110. Further, the communication device 1102 may be configured for transmitting one or more musical segment information of the one or more musical segments to the client device 1002. Further, the processing device 1104 may be configured for analyzing the at least one request. Further, the processing device 1104 may be configured for creating a music creating session based on the at least one request. Further, the processing device 1104 may be configured for generating the one or more musical segment information for the one or more musical segments based on a list and the at least one playing information. Further, the one or more musical segment information may include the at least one musical segment information and a second musical segment indication of the second musical segment. Further, the obtaining of the second musical segment may be based on the second musical segment indication. Further, the storage device 1402 may be configured for retrieving the list of the one or more musical segments playable in the music creating session based on the creating.

Further, in some embodiments, the communication device 1102 may be configured for receiving an indication of a musical segment from a first user device 1112 (as shown in FIG. 11) associated with a first user. Further, the processing device 1104 may be configured for analyzing the musical segment and the one or more musical segments based on at least one criterion. Further, the processing device 1104 may be configured for determining an includability of the musical segment into the list based on the analyzing of the musical segment and the one or more musical segments. Further, the processing device 1104 may be configured for incorporating the musical segment into the list. Further, the generating of the at least one playing information may be based on the incorporating.

Figure 15:
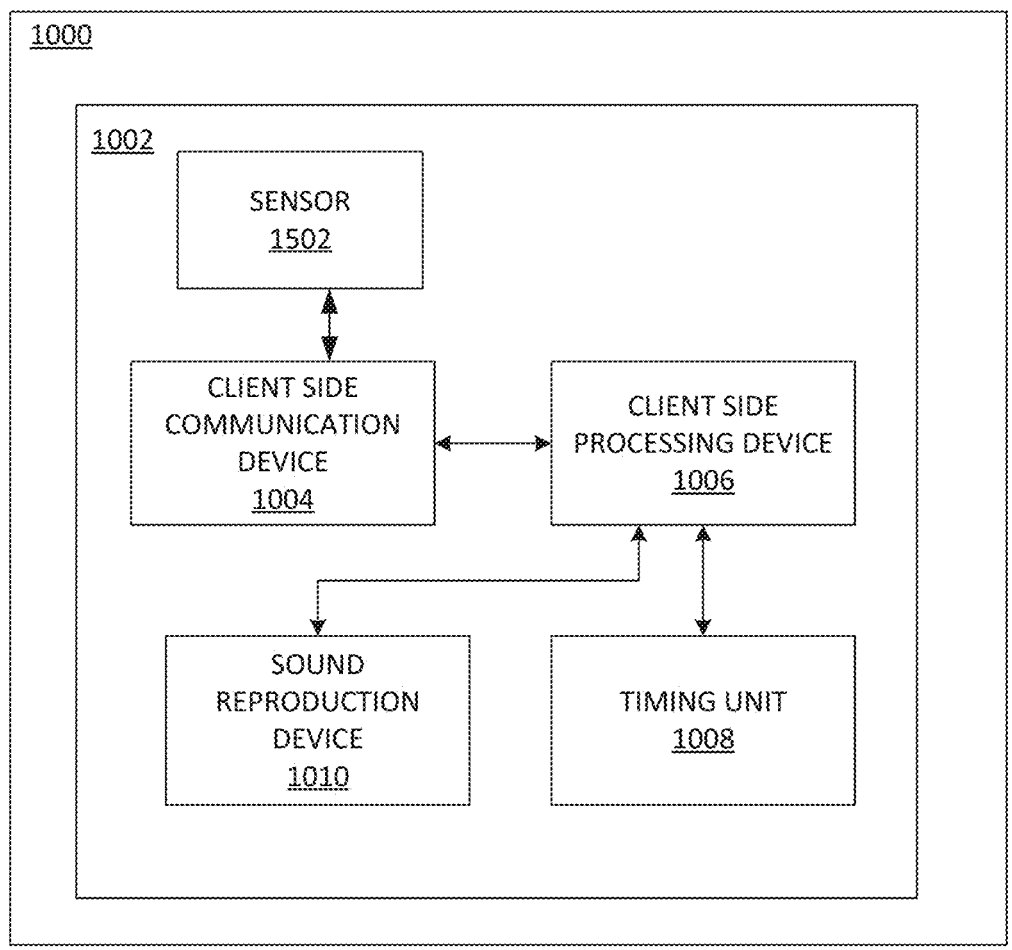
FIG. 15 is a block diagram of the system 1000 for facilitating collaborative music creation, in accordance with some embodiments.

Further, in some embodiments, the client device 1002 may include a sensor 1502 (as shown in FIG. 15) configured for detecting a presence of at least one client device proximal to the client device 1002. Further, the receiving of the at least one musical segment information may be based on the detecting of the presence.

FIG. 11 is a block diagram of the system 1000 for facilitating collaborative music creation, in accordance with some embodiments.

FIG. 12 is a block diagram of the system 1000 for facilitating collaborative music creation, in accordance with some embodiments.

FIG. 13 is a block diagram of the system 1000 for facilitating collaborative music creation, in accordance with some embodiments.

FIG. 14 is a block diagram of the system 1000 for facilitating collaborative music creation, in accordance with some embodiments.

FIG. 15 is a block diagram of the system 1000 for facilitating collaborative music creation, in accordance with some embodiments.

Figure 16:
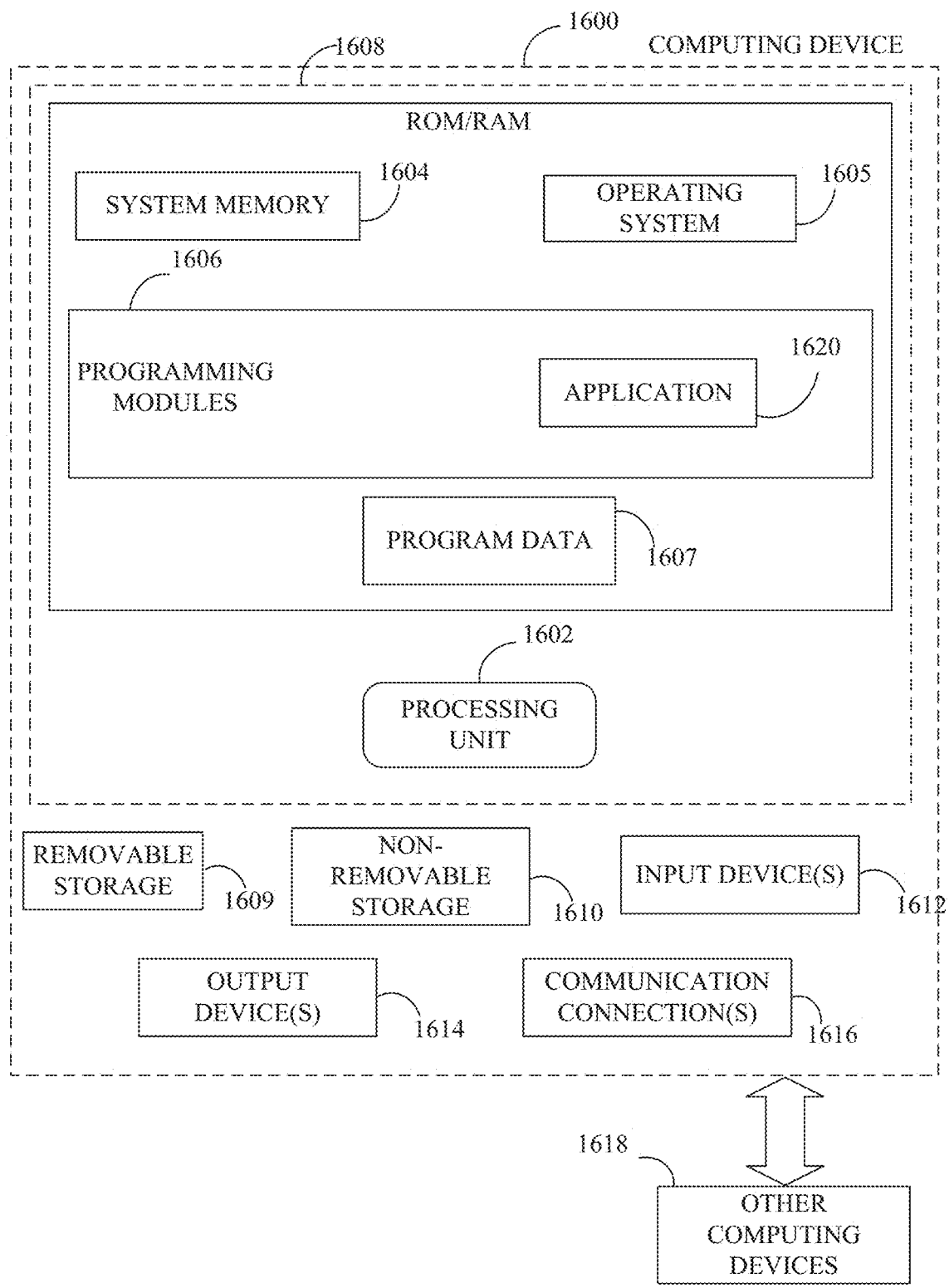
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

REFERENCES

[1]: [What is Looping and How to Use it In Your Music Production—LANDR Blog] (https://blog.landr.com/looping/)
[2]: [What is Looping in Music and How do I Use It?—eMastered] (https://emastered.com/blog/what-is-looping-in-music)
[3]: [Practical Uses for a Guitar Looper Pedal] (https://pathfinderguitar.com.au/guitar-blog/practical-uses-for-a-guitar-looper-pedal)
[4]: [The Versatility of Loopers: Practicing Solos and Live Hacks-She Shreds] (https://sheshreds.com/the-versatility-of-loopers/) [5]: [Loop (music)-Wikipedia] (https://en.wikipedia.org/wiki/Loop_(music))
[6]: [What is looping in music? How to use loops in music production | Native Instruments Blog] (https://blog.native-instruments.com/loops-in-music/)
[7]: [Live Looping Techniques—Ableton] (https://www.ableton.com/en/blog/live-looping-techniques/)
[8]: [list of online music creation tools by Charles Holbrow, PhD student in the Future Music department at MIT] (https://web.media.mit.edu/~holbrow/post/music-collaboration-and-covid-19-quarantine/)

What is claimed is:

1. A method for facilitating collaborative live music creation, the method comprising:
   receiving, using a client side communication device of a client device, at least one musical segment information associated with at least one musical segment;
   obtaining, using a client side processing device of the client device, at least one of the at least one musical segment and a second musical segment;

obtaining, using a timing unit of the client device, at least one time reading of at least one time reference;

synchronizing, using the client side processing device of the client device, at least one of the second musical segment and the at least one musical segment with the at least one time reference based on the at least one time reading, wherein the synchronizing comprises aligning a beat of at least one of the at least one musical segment and the second musical segment with the at least one time reference in a uniform way, wherein the aligning of the beat corresponds to a uniform mapping of the beat to a timeline defined by the at least one time reading comprising at least one timestamp;

initiating, using a sound reproduction device of the client device, a playback of at least one of the at least one musical segment and the second musical segment based on the synchronizing;

generating, using the client side processing device of the client device, a prompt based on the initiating of the playback, wherein the prompt is affirmable at any point during the playback of at least one of the at least one musical segment and the second musical segment;

obtaining, using the client side processing device of the client device, a response corresponding to the prompt;

generating, using the client side processing device of the client device, at least one second musical segment information of the second musical segment based on the synchronizing and the response; and transmitting, using the client side communication device of the client device, the at least one second musical segment information of the second musical segment.

2. The method of claim 1, wherein the client device is associated with a participant of a music creating session, wherein the at least one musical segment is played using at least one client device associated with at least one participant of the music creating session, in the music creating session, wherein the at least one musical segment information comprises at least one musical segment indication of the at least one musical segment and at least one participant indication of the at least one participant, wherein the at least one participant indication comprises at least one location indication corresponding to at least one location of the at least one participant and at least one identification indication corresponding to at least one identification of the at least one participant, wherein the method further comprises:

locating, using the client side processing device of the client device, the at least one participant on at least one map based on the at least one location indication;

generating, using the client side processing device of the client device, at least one map representation comprising at least one of the at least one identification indication of the at least one participant in the at least one location, the at least one location indication of the at least one participant, and the at least one musical segment indication associated with the at least one participant based on the locating, the at least one participant indication, and the at least one musical segment indication;

displaying, using a user interface device of the client device, the at least one musical segment indication and the at least one participant indication, wherein the displaying of the at least one musical segment indication and the at least one participant indication comprises displaying the at least one map representation;

receiving, using the user interface device of the client device, at least one selection of the at least one participant indication; and establishing, using the user interface device of the client device, at least one communication session with the at least one client device based on the at least one selection, wherein the establishing of the at least one communication session allows at least one communication between the client device and the at least one client device.

3. The method of claim 1 further comprising:

analyzing, using the client side processing device of the client device, the second musical segment;

obtaining, using the client side processing device of the client device, at least one metadata of the second musical segment based on the analyzing of the second musical segment; and analyzing, using the client side processing device of the client device, the at least one musical segment information and the at least one metadata using a real time quantization (RTQ) algorithm, wherein the RTQ algorithm aligns the tempo of at least one of the at least one musical segment and the second musical segment to a universal tempo, wherein the synchronization is further based on the analyzing of the at least one musical segment information and the at least one metadata, wherein the synchronization based on the analyzing of the at least one musical segment information and the at least one metadata using the RTO algorithm is performed without a connection between the client device and at least one client device, and solely relies on the at least one time reference, together with the at least one metadata of an input tempo, without requiring connections to other client devices, wherein the at least one time reference comprises a Global Positioning System (GPS) Time or a Network Time Protocol (NTP) Servers time.

4. The method of claim 1 further comprising:

receiving, using a communication device, a request to join at least one existing music creating session from a user device associated with a user;

analyzing, using a processing device, the request and at least one characteristic of each of the at least one existing music creating session for matching the user to the at least one existing music creating session, wherein the at least one characteristic comprises at least one musical property of a music comprised of the at least one musical segment playing in each of the at least one existing music creating session, and at least one inclusion rule for each of the at least one existing music creating session;

identifying, using the processing device, a music creating session from the at least one existing music creating session for the user based on the analyzing of the request and the at least one characteristic;

identifying, using the processing device, the user as a participant of a plurality of participants of the music creating session based on the identifying of the music creating session; and transmitting, using the communication device, the at least one musical segment information of the at least one musical segment associated with the music creating session to the client device associated with each of the plurality of participants.

5. The method of claim 4 further comprising:

analyzing, using the processing device, the at least one musical segment information using at least one machine learning model, wherein the at least one machine learning model is trained using a dataset comprising a plurality of musical segment information of a plurality of musical segments, wherein the at least one machine learning model is configured for identifying a plurality of second musical segments with a plurality of degrees of affinity towards the plurality of musical segments;

determining, using the processing device, an affinity of the at least one musical segment towards one or more potential second musical segments using the at least one machine learning model based on the analyzing of the at least one musical segment information;

generating, using the processing device, at least one recommendation for the one or more potential second musical segments based on the determining of the affinity; and transmitting, using the communication device, the at least one recommendation of the one or more potential second musical segments to the client device of each of the plurality of participants, wherein the client device is configured for presenting, using a presenting device of the client device, the at least one recommendation, wherein the obtaining comprises obtaining the second musical segment from the one or more potential second musical segments based on the at least one recommendation.

6. The method of claim 4, wherein the at least one musical segment information comprises at least one music characteristic of the music comprising the at least one musical segment, wherein the method further comprises:

analyzing, using the client side processing device of the client device, the at least one music characteristic using a real time quantization (RTQ) algorithm;

scheduling, using a universal metronome of the client device, one or more signals of the universal metronome based on the analyzing of the at least one music characteristic;

producing, using the universal metronome of the client device, the one or more signals for a client based on the scheduling; and recording, using a universal looper of the client device, the second musical segment based the one or more signals, wherein the obtaining is further based on the recording.

7. The method of claim 1 further comprising:

receiving, using a communication device, at least one request from at least one first user device associated with at least one first user;

identifying, using a processing device, at least one second user based on the at least one request;

creating, using the processing device, at least one music creating session for the at least one first user and the at least one second user based on the identifying of the at least one second user;

identifying, using the processing device, the at least one first user and the at least one second user as a plurality of participants of the at least one music creating session based on the creating of the at least one music creating session; and retrieving, using a storage device, a plurality of musical segment information of a plurality of musical segments associated with at least one of the at least one first user and the at least one second user based on the identifying of the at least one first user and the at least one second user as the plurality of participants of the at least one music creating session; and transmitting, using the communication device, the plurality of musical segment information to the client device, wherein the plurality of musical segment information comprises the at least one musical segment information and the at least one second musical segment information.

8. The method of claim 1 further comprising:

receiving, using a communication device, at least one request from at least one user device associated with at least one user;

analyzing, using a processing device, the at least one request;

creating, using the processing device, a music creating session based on the at least one request;

retrieving, using a storage device, a list of one or more musical segments playable in the music creating session based on the creating;

receiving, using the communication device, at least one playing information for playing the one or more musical segments from the at least one user device;

generating, using the processing device, one or more musical segment information for the one or more musical segments based on the list and the at least one playing information; and transmitting, using the communication device, the one or more musical segment information to the client device, wherein the one or more musical segment information comprises the at least one musical segment information and a second musical segment indication of the second musical segment, wherein the obtaining of the second musical segment is based on the second musical segment indication.

9. The method of claim 8 further comprising:

receiving, using the communication device, an indication of a musical segment from a first user device associated with a first user;

analyzing, using the processing device, the musical segment and the one or more musical segments based on at least one criterion;

determining, using the processing device, an includability of the musical segment into the list based on the analyzing of the musical segment and the one or more musical segments; and incorporating, using the processing device, the musical segment into the list, wherein the generating of the at least one playing information is further based on the incorporating.

10. The method of claim 1 further comprising detecting, using a sensor of the client device, a presence of at least one client device proximal to the client device, wherein the receiving of the at least one musical segment information is based on the detecting of the presence.

11. A system for facilitating collaborative live music creation, wherein the system comprises a client device, wherein the client device comprises:

a client side communication device configured for:
receiving at least one musical segment information associated with at least one musical segment; and
transmitting at least one second musical segment information of a second musical segment;

a timing unit configured for obtaining at least one time reading of at least one time reference;

a client side processing device communicatively coupled with the client side communication device and the timing unit, wherein the client side processing device is configured for:
obtaining at least one of the at least one musical segment and the second musical segment;
synchronizing at least one of the second musical segment and the at least one musical segment with the at least one time reference based on the at least one time reading, wherein the synchronizing comprises aligning a beat of at least one of the at least one musical segment and the second musical segment with the at least one time reference in a uniform way, wherein the aligning of the beat corresponds to a uniform mapping of the beat to a timeline defined by the at least one time reading comprising at least one timestamp;

generating a prompt;

obtaining a response corresponding to the prompt; and generating the at least one second musical segment information of the second musical segment based on the synchronizing and the response; and a sound reproduction device communicatively coupled with the client side processing device, wherein the sound reproduction device is configured for initiating a playback of at least one of the at least one musical segment and the second musical segment based on the synchronizing, wherein the generating of the prompt is based on the initiating of the playback, wherein the prompt is affirmable at any point during the playback of at least one of the at least one musical segment and the second musical segment.

12. The system of claim 11, wherein the client device is associated with a participant of a music creating session, wherein the at least one musical segment is played using at least one client device associated with at least one participant of the music creating session, in the music creating session, wherein the at least one musical segment information comprises at least one musical segment indication of the at least one musical segment and at least one participant indication of the at least one participant, wherein the at least one participant indication comprises at least one location indication corresponding to at least one location of the at least one participant and at least one identification indication corresponding to at least one identification of the at least one participant, wherein the client device further comprises a user interface device communicatively coupled with the client side communication device, wherein the client side processing device is further configured for:

locating the at least one participant on at least one map based on the at least one location indication; and generating at least one map representation comprising at least one of the at least one identification indication of the at least one participant in the at least one location, the at least one location indication of the at least one participant, and the at least one musical segment indication associated with the at least one participant based on the locating, the at least one participant indication, and the at least one musical segment indication, wherein the user interface device is configured for:

displaying the at least one musical segment indication and the at least one participant indication, wherein the displaying of the at least one musical segment indication and the at least one participant indication comprises displaying the at least one map representation;

receiving at least one selection of the at least one participant indication; and establishing at least one communication session with the at least one client device based on the at least one selection, wherein the establishing of the at least one communication session allows at least one communication between the client device and the at least one client device.

13. The system of claim 11, wherein the client side processing device is further configured for:

analyzing the second musical segment;

obtaining at least one metadata of the second musical segment based on the analyzing of the second musical segment; and analyzing the at least one musical segment information and the at least one metadata using a real time quantization (RTQ) algorithm, wherein the RTQ algorithm aligns the tempo of at least one of the at least one musical segment and the second musical segment to a universal tempo, wherein the synchronization is further based on the analyzing of the at least one musical segment information and the at least one metadata, wherein the synchronization based on the analyzing of the at least one musical segment information and the at least one metadata using the RTO algorithm is performed without a connection between the client device and at least one client device, and solely relies on the at least one time reference, together with the at least one metadata of an input tempo, without requiring connections to other client devices, wherein the at least one time reference comprises a Global Positioning System (GPS) Time or a Network Time Protocol (NTP) Servers time.

14. The system of claim 11 further comprising:

a communication device configured for:

receiving a request to join at least one existing music creating session from a user device associated with a user; and transmitting the at least one musical segment information of the at least one musical segment associated with a music creating session to the client device associated with each of a plurality of participants; and a processing device communicatively coupled with the communication device, wherein the processing device is configured for:

analyzing the request and at least one characteristic of each of the at least one existing music creating session for matching the user to the at least one existing music creating session, wherein the at least one characteristic comprises at least one musical property of a music comprised of the at least one musical segment playing in each of the at least one existing music creating session, and at least one inclusion rule for each of the at least one existing music creating session;

identifying the music creating session from the at least one existing music creating session for the user based on the analyzing of the request and the at least one characteristic; and identifying the user as a participant of the plurality of participants of the music creating session based on the identifying of the music creating session.

15. The system of claim 14, wherein the processing device is further configured for:

analyzing the at least one musical segment information using at least one machine learning model, wherein the at least one machine learning model is trained using a dataset comprising a plurality of musical segment information of a plurality of musical segments, wherein the at least one machine learning model is configured for identifying a plurality of second musical segments with a plurality of degrees of affinity towards the plurality of musical segments;

determining an affinity of the at least one musical segment towards one or more potential second musical segments using the at least one machine learning model based on the analyzing of the at least one musical segment information; and generating at least one recommendation for the one or more potential second musical segments based on the determining of the affinity, wherein the communication device is further configured for transmitting the at least one recommendation of the one or more potential second musical segments to the client device of each of the plurality of participants, wherein the client device further comprises a presenting device configured for presenting the at least one recommendation, wherein the obtaining comprises obtaining the second musical segment from the one or more potential second musical segments based on the at least one recommendation.

16. The system of claim 14, wherein the at least one musical segment information comprises at least one music characteristic of the music comprising the at least one musical segment, wherein the client side processing device is further configured for analyzing the at least one music characteristic using a real time quantization (RTQ) algorithm, wherein the client device further comprises:

a universal metronome communicatively coupled with the client side processing device, wherein the universal metronome is configured for:
scheduling one or more signals of the universal metronome based on the analyzing of the at least one music characteristic; and
producing the one or more signals for a client based on the scheduling; and a universal looper communicatively coupled with the universal metronome, wherein the universal looper is configured for recording the second musical segment based the one or more signals, wherein the obtaining is further based on the recording.

17. The system of claim 11 further comprising:
a communication device configured for:
receiving at least one request from at least one first user device associated with at least one first user; and
transmitting a plurality of musical segment information to the client device;
a processing device communicatively coupled with the communication device, wherein the processing device is configured for:
identifying at least one second user based on the at least one request;
creating at least one music creating session for the at least one first user and the at least one second user based on the identifying of the at least one second user; and
identifying the at least one first user and the at least one second user as a plurality of participants of the at least one music creating session based on the creating of the at least one music creating session; and
a storage device communicatively coupled with the processing device, wherein the storage device is configured for retrieving the plurality of musical segment information of a plurality of musical segments associated with at least one of the at least one first user and the at least one second user based on the identifying of the at least one first user and the at least one second user as the plurality of participants of the at least one music creating session, wherein the plurality of musical segment information comprises the at least one musical segment information and the at least one second musical segment information.

18. The system of claim 11 further comprising:
a communication device configured for:
receiving at least one request from at least one user device associated with at least one user;
receiving at least one playing information for playing one or more musical segments from the at least one user device; and
transmitting one or more musical segment information of the one or more musical segments to the client device;
a processing device communicatively coupled with the communication device, wherein the processing device is configured for:
analyzing the at least one request;
creating a music creating session based on the at least one request; and
generating the one or more musical segment information for the one or more musical segments based on a list and the at least one playing information, wherein the one or more musical segment information comprises the at least one musical segment information and a second musical segment indication of the second musical segment, wherein the obtaining of the second musical segment is based on the second musical segment indication; and
a storage device communicatively coupled with the processing device, wherein the storage device is configured for retrieving the list of the one or more musical segments playable in the music creating session based on the creating.

19. The system of claim 18, wherein the communication device is further configured for receiving an indication of a musical segment from a first user device associated with a first user, wherein the processing device is further configured for:
analyzing the musical segment and the one or more musical segments based on at least one criterion;
determining an includability of the musical segment into the list based on the analyzing of the musical segment and the one or more musical segments; and
incorporating the musical segment into the list, wherein the generating of the at least one playing information is further based on the incorporating.

20. The system of claim 11, wherein the client device further comprises a sensor configured for detecting a presence of at least one client device proximal to the client device, wherein the receiving of the at least one musical segment information is based on the detecting of the presence.

* * * * *